United States Patent
Lee et al.

(10) Patent No.: US 10,647,896 B2
(45) Date of Patent: May 12, 2020

(54) HYDROGENATED PETROLEUM RESIN, AND PRODUCTION METHOD AND USE THEREFOR

(71) Applicant: KOLON INDUSTRIES, INC., Gwacheon-si, Gyeonggi-do (KR)

(72) Inventors: Sang Hyun Lee, Yongin-si (KR); Min Sik Cho, Yongin-si (KR); Jun Hyo Park, Yongin-si (KR); Joong Suk Lee, Yongin-si (KR)

(73) Assignee: KOLON INDUSTRIES, INC., Gwacheon-si, Gyeonggi-Do (KR)

( * ) Notice: Subject to any disclaimer, the term of this patent is extended or adjusted under 35 U.S.C. 154(b) by 174 days.

(21) Appl. No.: 15/740,641

(22) PCT Filed: Jun. 28, 2016

(86) PCT No.: PCT/KR2016/006905
§ 371 (c)(1),
(2) Date: Dec. 28, 2017

(87) PCT Pub. No.: WO2017/003157
PCT Pub. Date: Jan. 5, 2017

(65) Prior Publication Data
US 2018/0186903 A1 Jul. 5, 2018

(30) Foreign Application Priority Data
Dec. 31, 2015 (KR) .......................... 10-2015-0191077

(51) Int. Cl.
| | | |
|---|---|---|
| C08F 8/04 | (2006.01) | |
| C09J 147/00 | (2006.01) | |
| C09J 157/02 | (2006.01) | |
| C09J 123/08 | (2006.01) | |
| C08F 210/14 | (2006.01) | |
| C09J 123/14 | (2006.01) | |
| C08F 240/00 | (2006.01) | |
| C08F 232/08 | (2006.01) | |
| C08L 57/02 | (2006.01) | |
| C08L 45/00 | (2006.01) | |
| C09J 145/00 | (2006.01) | |
| C08F 32/00 | (2006.01) | |
| C09J 123/06 | (2006.01) | |
| C09J 123/16 | (2006.01) | |
| C09J 133/06 | (2006.01) | |

(52) U.S. Cl.
CPC .............. *C09J 147/00* (2013.01); *C08F 8/04* (2013.01); *C08F 32/00* (2013.01); *C08F 210/14* (2013.01); *C08F 232/08* (2013.01); *C08F 240/00* (2013.01); *C08L 45/00* (2013.01); *C08L 57/02* (2013.01); *C09J 123/06* (2013.01); *C09J 123/0853* (2013.01); *C09J 123/14* (2013.01); *C09J 123/16* (2013.01); *C09J 133/062* (2013.01); *C09J 145/00* (2013.01); *C09J 157/02* (2013.01)

(58) Field of Classification Search
CPC ............ C08F 8/04; C09J 145/00; C08L 45/00
USPC ......................................................... 524/505
See application file for complete search history.

(56) References Cited

U.S. PATENT DOCUMENTS

| | | | |
|---|---|---|---|
| 5,410,004 A | 4/1995 | Williams | |
| 5,652,308 A | 7/1997 | Merrill et al. | |
| 5,691,432 A * | 11/1997 | Williams | ................ C08F 32/08 526/283 |

FOREIGN PATENT DOCUMENTS

| | | |
|---|---|---|
| EP | 0207776 A2 | 1/1987 |
| EP | 0516733 A1 | 12/1992 |
| EP | 1416033 A1 | 5/2004 |
| JP | 05-001292 A | 1/1993 |
| JP | 05001292 A * | 1/1993 |
| JP | 3812855 B2 | 6/2006 |
| JP | 2009-256504 A | 11/2009 |
| KR | 10-1988-0000504 A | 3/1988 |
| KR | 10-176178 A | 6/1998 |
| KR | 10-2014-0004276 A | 1/2014 |
| KR | 10-2014-0020991 A | 2/2014 |
| KR | 10-2015-0031700 A | 3/2015 |

OTHER PUBLICATIONS

Translation of JP 05-001292, Kunugi et al., Jan. 8, 1993. (Year: 1993).*
Deng, Shunyang et al., Adhesive and Sealing material, China Petrochemical Press, Oct. 2001, pp. 222-223, Edition 1.

* cited by examiner

*Primary Examiner* — Hui H Chin
(74) *Attorney, Agent, or Firm* — Novick, Kim & Lee, PLLC; Jae Youn Kim

(57) ABSTRACT

The present invention relates to a hydrogenated petroleum resin, and to a manufacturing method and use thereof. More specifically, it relates to a hydrogenated petroleum resin manufactured by subjecting dicyclopentadiene and an olefinic monomer to thermal polymerization and then carrying out a hydrogenation reaction, and to a manufacturing method and use therefor. The hydrogenated petroleum resin has the advantage of being useful in practical applications, since the petroleum resin is manufactured via thermal polymerization using inexpensive raw materials and on the contrary to conventional catalytic polymerization, a catalyst elimination process can be excluded. The hydrogenated petroleum resin produced in this way can be applied to, for example, an adhesive agent used in environmentally friendly sanitary goods, because the petroleum resin has excellent compatibility, adhesiveness and heat resistance, and has no bad odor.

13 Claims, 11 Drawing Sheets

HYDROGENATED PETROLEUM RESIN, AND PRODUCTION METHOD AND USE THEREFOR

CROSS-REFERENCE(S) TO RELATED APPLICATION

This application claims priority of Korean Patent Application No. 10-2015-0093774, filed on Jun. 30, 2015, Korean Patent Application No. 10-2015-0191077, filed on Dec. 31, 2015, and Korean Patent Application No. 10-2016-0080204, filed on Jun. 27, 2016, which are hereby incorporated by reference in its entirety.

TECHNICAL FIELD

Field of the Invention

The present invention relates to a hydrogenated petroleum resin which can be applied to an adhesive agent, and manufacturing method and use thereof.

Background Art

Petroleum resin is a representative tackifier and mainly used to a material giving tackifying property or adhesiveness to an adhesive tape or a product such as paint, ink, rubber, tire and the like. It is a liquid or solid type thermoplastic resin at a room temperature and may have various forms from transparent semi-fluid to pale yellow and transparent colorless (Water White) solid.

The petroleum resin is generally manufactured vis processes such as polymerization of $C_5$ or $C_9$ diolefin oil with a catalyst (mainly $AlCl_3$ or $BF_3$) followed by catalyst removal, washing, resin separation and the like, and recently, the resin is manufactured by other polymerization method such as thermal polymerization or radical polymerization so as to improve properties.

U.S. Pat. No. 5,410,004 discloses a petroleum resin manufactured by thermal polymerization of dicyclopentadiene (DCPD) and olefinic modifier in the presence of an acidic catalyst. However, such petroleum resin contains a double bond and unreacted material in its molecular structure, and due to its weakness on heat or acid, there are problems that transparency of the petroleum resin during or after processing is deteriorated and bad odor becomes heavy. Thus, even if the hydrogenation reaction, which is a reaction to eliminate the double bond, is conducted, there may be various corrosion problems during the hydrogenation reaction due to the strong acid catalyst, thereby making it difficult to react. In addition, there is a problem of poor productivity due to low yield.

On the other hand, the petroleum resin can be used as it is after polymerization, and recently, it is used in the form of a hydrogenated petroleum resin which is manufactured by additionally conducting for enhancing properties.

The hydrogenated petroleum resin is a thermoplastic resin made from high-grade unsaturated hydrocarbons in high-temperature pyrolysis oil such as naphtha at a petrochemical plant, and it is has excellent stability for heat and ultraviolet rays (UV) and adhesive property. Therefore, it is variously used to medical supplies, woodworking supplies, sanitary goods and the like.

For the hydrogenated petroleum resin, it is difficult to completely remove unreacted raw materials, solvents and low molecular weight oligomers in the manufacturing process. Therefore, in the process of manufacturing sanitary goods such as diapers spraying adhesive agent at a high temperature, bad odor of the petroleum resin itself is induced, and the bad odor is developed when the package of the final product is opened. Further, because the unique and unpleasant bad order of the hydrogenated petroleum resin is formed during melting at a high temperature, it adversely affect the working environment, and when it is applied to sanitary goods, there was a limit to satisfying the needs of consumers who should use the products on sensitive and delicate skin due to bad odor inducing factor.

Thus, as the consumer's living standards increase, the demand for the bad odor of the petroleum resin used in the sanitary goods is increasing day by day, and therefore, the development of technology to improve the bad odor of the petroleum resin is urgently needed.

Accordingly, U.S. Pat. No. 5,652,308 discloses a tackifier resin wherein a part of a C5 monomer is partly replaced by a C3 monomer by copolymerizing propylene as a C3 monomer and DCPD manufactured from a C5 monomer using a metallocene catalyst. However, when manufacturing the petroleum resin by the above method, the expensive metallocene catalyst which is very weak on oxygen and moisture should be used. Therefore, the above method is difficult to put into practical use because the process design is complicated, the manufacturing cost is high, and the yield is also very low at less than 30%.

PRIOR ART DOCUMENT

[Patent Document]
U.S. Pat. No. 5,410,004 (1995 Apr. 25), Thermal polymerization of dicyclopentadiene
U.S. Pat. No. 5,652,308 (1997 Jul. 29), Tackifiers and a process to obtain tackifiers

DETAILED DESCRIPTION OF THE INVENTION

Technical Problem

In order to solve the above problems, the present inventors have conducted multi-modal studies, and then found that when manufacturing a hydrogenated petroleum resin by conducting a hydrogenation reaction after thermal polymerization, not complicated catalytic polymerization, if, as a raw material, dicyclopentadiene is used together with an olefinic monomer as a co-monomer 또 olefinic monomer, adhesive force and heat resistance of the finally obtained hydrogenated petroleum resin are enhanced, bad odor is improved, and when it is applied to an adhesive agent, its properties also improved, thereby completing the present invention.

Accordingly, an object of the present invention is to provide a method for manufacturing a hydrogenated petroleum resin, which can be easily put to practical use, by a simplified process.

Further, another object of the present invention is to provide a hydrogenated petroleum resin, which is manufactured by the above method, thereby having enhanced properties and improved bad odor.

Further, further another object of the present invention is to provide a use of the hydrogenated petroleum resin as an adhesive agent.

Technical Solution

In order to accomplish the objects described above, provided is a hydrogenated petroleum resin containing repeating units represented by the following Chemical Formulas 1 and 2:

[Chemical Formula 1]

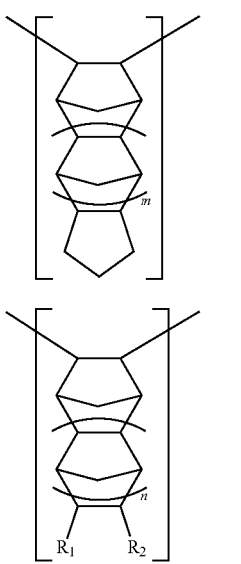

[Chemical Formula 2]

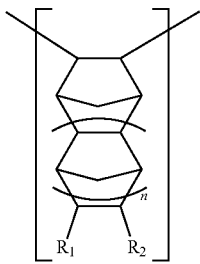

wherein, $R_1$ is H or a methyl group, $R_2$ is a C1 to C18 alkyl group, and $0 \leq m \leq 10$ and $0 \leq n \leq 10$.

Further, the present invention provides a method for manufacturing a hydrogenated petroleum resin comprising the following steps of:

thermally polymerizing dicyclopentadiene and a C3 to C20 olefinic monomer to prepare a petroleum resin; and subjecting the petroleum resin to a hydrogenation reaction with a hydrogenation catalyst.

Further, the present invention provides a use of the hydrogenated petroleum resin to be used in a composition for adhesion.

Advantageous Effect

A method for manufacturing the hydrogenated petroleum resin according to the present invention solves a problem of demand and supply of a raw material by replacing a C3 olefin used as a raw material of a conventional petroleum resin with C6 to C20 olefin, and largely enhances a polymerization yield by using a thermal polymerization process instead of a catalytic polymerization process for polymerization.

In particular, the hydrogenated petroleum resin manufactured by the manufacturing method of the present invention solves the problem which was not improved in the conventional petroleum resin and forms the unique and unpleasant bad odor, thereby improving the bad odor so that the odor does not occur.

Further, the hydrogenated petroleum resin manufactured by the above method has excellent bad odor and adhesiveness, high softening point, excellent transparency and color, low molecular weight, and excellent compatibility to natural rubber or synthetic rubber. Accordingly, it can be useful as an adhesive agent in the various fields, and in particular, it can be more competitive when it is applied to sanitary goods.

BEST MODE FOR CARRYING OUT THE INVENTION

Figure 1:
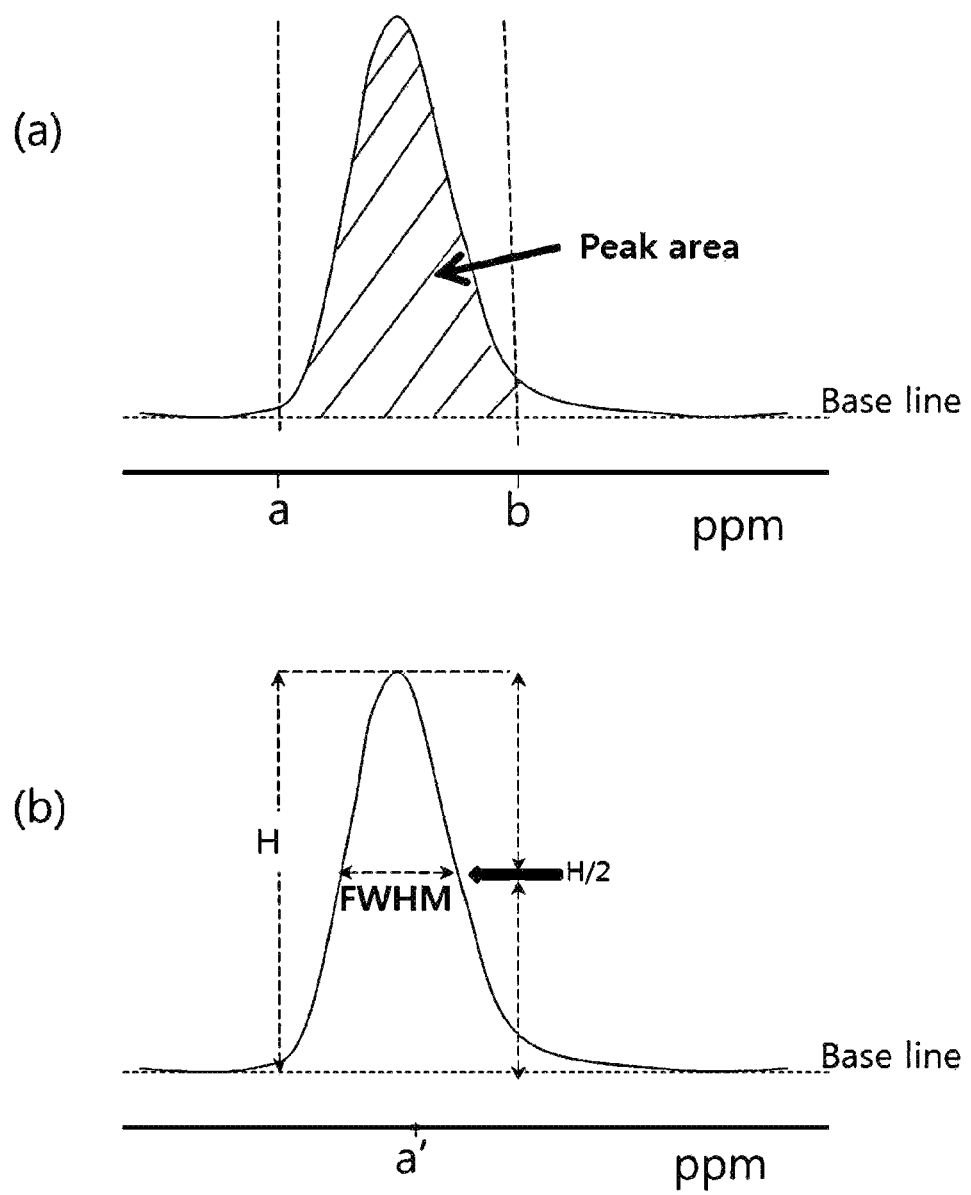
FIG. 1 is a mimetic diagram for explaining NMR spectrum analysis presented in the present invention, wherein (a) shows peak area and (b) shows full width at half maximum (FWHM).

The present invention provides a petroleum resin with a novel structure, which has improved bad odor and therefore can be applied to an adhesive agent or tackifier and the like.

Hydrogenated Petroleum Resin

The hydrogenated petroleum resin according to the present invention is manufacture by thermal polymerization of dicyclopentadiene and an olefinic monomer followed by a hydrogenation reaction, and contains repeating units represented by the following Chemical Formulas 1 and 2:

[Chemical Formula 1]

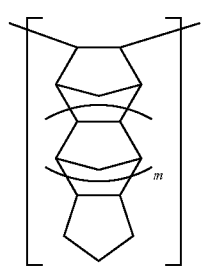

[Chemical Formula 2]

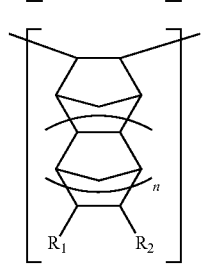

wherein, $R_1$ is H or a methyl group, $R_2$ is a C1 to C18 alkyl group, and $0 \leq m \leq 10$ and $0 \leq n \leq 10$.

Preferably, $R_1$ may be H, and $R_2$ may be a C1 to C18 alkyl group.

The alkyl group may be a linear or a branched alkyl group, preferably a linear alkyl group. For example, it may preferably be a methyl group, an ethyl group, a propyl group, a butyl group, a pentyl group, a hexyl group, a octyl group, a nonyl group, a decyl group, a dodecyl group or a tetradecyl group, preferably a C4 or more alkyl group such as a butyl group, a pentyl group, a hexyl group, a octyl group, a nonyl group, a decyl group, a dodecyl group or a tetradecyl group.

The hydrogenated petroleum resin according to the present invention contains the repeating units of Chemical Formulas 1 and 2, but it is saturated without a double bond in the molecular structure, and the repeating units are copolymerized.

At this time, for convenience's sake, the shape of the copolymer is expressed as above, but it is not particularly limited, and it may be various such as random copolymer, alternative copolymer, block copolymer, graft copolymer and star block copolymer.

Specifically, the repeating unit of Chemical Formula 1 is derived from dicyclopentadiene, the repeating unit of Chemical Formula 2 is derived from polymerization reaction of dicyclopentadiene and an olefinic monomer as a co-monomer, and the units have a structure whose end is substituted with an alkyl group. Bad odor of the petroleum resin is improved by using the olefin-derived alkyl group constituting the repeating unit of Chemical Formula 2. At this time, the petroleum resin may contain the olefin-derived alkyl group in an amount of 10 mol % to 50 mol %, preferably 10 mol % to 45 mol %. If the amount of the alkyl group is less than the above range, it may be difficult to reveal the effect of improving adhesion performance and bad odor caused by copolymerization with the olefinic monomer, and if the amount is over the range, the adhesion performance may be deteriorated.

Further, it is preferred that the repeating units of Chemical Formulas 1 and 2 are contained at a certain molar ratio, and specifically, the repeating unit of Chemical Formula 1 is contained at 40 mol % to 90 mol % and the repeating unit of Chemical Formula 2 is contained at 10 mol % to 60 mol %. If the amount of the repeating unit of Chemical Formula 2 is relatively small, the effects of improving bad odor and adhesion performance can't be secured. On the contrary, if the amount thereof is excessive, properties of the petroleum resin itself are deteriorated. Therefore, the unit should be properly used within the above range.

The hydrogenated petroleum resin according to the present invention having the above structure may be analyzed through a $^1$H-NMR analyzer (nuclear magnetic resonance spectrometry), and the hydrogenated petroleum resin can be specified by analyzing the peak thus obtained.

$^1$H-NMR analysis is an analytical method to find out what atom is bonding with a hydrogen atom in a compound, and which functional groups are involved, as well as the spatial arrangement. This method is used for identification and confirmation of a compound, and it may be used for measuring change on bonding state as well as quantitative analysis of a mixture and estimation of molecular structure.

In the $^1$H-NMR spectrum, the proton (H$^+$) in the same relationship in the molecule appears as one peak, and if it is closely related to another nucleus, it divides into multiple lines. At this time, the peaks differ in the position of the chemical shifts (i.e., frequency interval, ppm), and their intensities vary according to the proton present in single and double bonds (i.e., unsaturated bonds). Namely, the chemical shift data can be used to determine what kind of proton is present in the molecule, what proportion of each proton exists through the intensity (integral), and which proton is adjacent to each other through coupling.

The hydrogenated petroleum resin presented in the present invention has the repeating units of Chemical Formulas 1 and 2, and at this time, the repeating unit of Chemical Formula 1 is composed of only a dicyclopentadiene-derived ring structure, and the repeating unit of Chemical Formula 2 is composed of a linear structure of the olefin-derived alkyl group together with the above ring structure. As a result, the hydrogenated petroleum resin can be specified by confirming the peak specifying $R_2$ of Chemical Formula 2.

$^1$H-NMR spectrum of the hydrogenated petroleum resin is not revealed as a peak like a compound, and due to the presence of a large number of protons, as shown in FIG. 3 to FIG. 11, they interact with each other and peaks are present in a given area. Generally, the more protons (hydrogen) is, the more intense it is, because it may be longer $R_2$, or the higher the content of $R_2$-substituted repeating unit of Chemical Formula 2. Accordingly, in the present invention, the petroleum resin is specified by considering both of the above two parameters.

When measuring from 0.0 ppm to 9.0 ppm, in $^1$H-NMR data of the hydrogenated petroleum resin of the present invention, there are many peak related to the repeating units of Chemical Formulas 1 and 2 up to 7.5 ppm. Among them, the peaks from 0.8 ppm to 1.4 ppm are proton peaks derived from $R_2$, and other peaks are proton peaks derived from a ring structure of dicyclopentadiene.

$^1$H-NMR spectrum peak is related to the number of protons and the peak analysis between 0.8 ppm and 1.4 ppm is very important to confirm that $R_2$ is bound to the hydrogenated petroleum resin of the present invention. At this time, the peak analysis is divided into a case of using the peak area as a parameter and a case of using the peak width as a parameter. Namely, by analyzing the parameters related to the peak area and the peak width, quantitative analysis and qualitative analysis are possible and can be identified through the present invention of the hydrogenated petroleum resin.

FIG. 1 is a mimetic diagram for explaining NMR spectrum presented in the present invention, wherein (a) shows peak area and (b) shows definition of FWHM.

In FIG. 1(a), a ppm to b ppm peak area presented in the present invention refers to the area of the corresponding region when cutting the peak in the vertical direction including the baseline at points a and b ppm of the chemical shift of the X-axis.

Further, in FIG. 1(b), a' ppm peak width (FWHM) presented in the present invention refers to the width at half point (H/2) of the peak height (H) including the baseline at the a 'point of the chemical shift of the X axis.

(i) NMR Peak Area Parameter

The hydrogenated petroleum resin of the present invention can be specified by a parameter of the peak area, and at this time, the peak area has the same definition shown in FIG. 1(a).

The alkyl group peak of $R_2$ related to olefin occurs in the range of 0.8 ppm to 1.4 ppm, and the peak is divided into two peaks in this range. The peak at 0.8 ppm to 1.0 ppm and the peak at 1.0 ppm to 1.4 ppm are related to the content of $R_2$, and the ratio of the peak at 0.8 ppm to 1.0 ppm and the peak at 1.0 ppm to 1.4 ppm correspond to the carbon number of $R_2$ i.e., the peak is about the type of olefin used.

From this information, the hydrogenated petroleum resin according to the present invention can estimate the content of $R_2$ in the entire hydrogenated petroleum resin by measuring the peak area obtained after $^1$H-NMR measurement. At this time, the area can be easily derived from NMR spectroscope.

Preferably, in the NMR spectrum obtained after $^1$H-NMR measurement, the hydrogenated petroleum resin of the present invention has the peak area at 0.8 ppm to 1.0 ppm against peak area at 1.4 ppm to 7.5 ppm of 0.2 or more, preferably a range from 0.2 to 0.8, more preferably a range from 0.5 to 0.7. The area ratio is related to the $R_2$ content and the effect desired to obtain by the substitution of an alkyl group. Namely, if the area ratio is out of the range, it is difficult to secure the effects such as enhancement of heat resistance and improvement of bad odor of the petroleum resin.

Further, in the NMR spectrum obtained after $^1$H-NMR measurement, the hydrogenated petroleum resin of the present invention has the peak area at 1.0 ppm to 1.4 ppm against peak area at 1.4 ppm to 7.5 ppm of 0.5 or more, preferably a range from 0.5 to 0.8, more preferably arrange from 0.6 to 0.7. The area ratio is related to the kind of $R_2$ and the effect desired to obtain by the substitution of an alkyl group. Namely, if the area ratio is out of the range, it is difficult to secure the effects such as enhancement of heat resistance and improvement of bad odor of the petroleum resin.

In this specific range, through the NMR peak area, the content of the alkyl group ($R_2$) in the hydrogenated petroleum resin and the kind of the olefinic monomer used can be predicted. At this time, each peak area ratio may be satisfied by at least one thereof, and more preferably satisfied by all of them.

(ii) NMR Peak Width Parameter

The hydrogenated petroleum resin of the present invention can be specified by a parameter of FWHM of the peak, and at this time, the peak width has the same definition shown in FIG. 1(b).

As described in the above (i), the peak related to $R_2$ is shown at 0.8 ppm to 1.4 ppm, the peak related to the content of $R_2$ at 0.8 ppm to 1.0 ppm and the peak related to the kind of $R_2$ at 1.0 ppm to 1.4 ppm are specified by FWHM parameter.

Preferably, in connection with the degree of substitution of $R_2$, FWHM at 0.85 ppm is confirmed, and in connection with the carbon number of $R_2$, FWHM at 1.20 ppm is confirmed. As a result, it is preferred that FWHM at 0.85 ppm peak is 0.1 ppm or less, preferably 0.01 ppm to 0.1 ppm, and FWHM at 1.20 ppm peak is 0.4 ppm or less, preferably 0.01 ppm to 0.4 ppm.

As described in the above (i), the FWHM parameter is a limited range to achieve enhancement of adhesion and improvement of bad odor through the use of olefinic monomer, and if the parameter is out of the range, the effects can't be secured. Preferably, the hydrogenated petroleum resin according to the present invention may be satisfied by at least one of the FWHMs at 0.85 ppm and 1.20 ppm, and more preferably satisfied by all of them.

Further, the hydrogenated petroleum resin according to the present invention is characterized by having weight average molecular weight of 500 g/mol to 3,000 g/mol, softening point of 90° C. to 150° C. and color (APHA color) of 1 to 100. If the weight average molecular weight is less than 500 g/mol, adhesive force may be deteriorated, and if it is more than 3000 g/mol, compatibility may be poor. If the softening point is lower than 90° C., adhesive force may be deteriorated, and if it is higher than 150° C., it is not preferred because it is difficult to be applied to a manufacturing process. Accordingly, it is not preferred.

The weight average molecular weight is related to the application field of hydrogenated petroleum resin. For example, the range is that the weight average molecular weight can be fully utilized when applied to the adhesive agent field suggested in the following Use part. If the molecular weight is less than the above range, adhesiveness may be deteriorated, and on the contrary, if it is more than the above range, compatibility with other resin may be deteriorated.

The softening point means a temperature at which softening is caused by heat, and if the softening point is too low when applied to the adhesive agent field, there may be a problem that the petroleum resin itself may melt during storage of the petroleum resin, and on the contrary, if the softening point is over the range, there may be a problem that adhesive property of the adhesive agent may be deteriorated.

Further, the APHA color related to color is applied to measure the chromaticity of a clear liquid and a solid state, and is usually expressed by subdividing the color into 1 to 500 levels. Its value has a correlated with a yellowness index. The hydrogenated petroleum resin of the present invention has APHA value of 1 to 100, and if it is more than 100, it may show opaque property or color is turbid when mixed with other resin, resulting in deterioration of the value of a product.

Further, compatibility indicates how well the resin is compatible with the other ingredients, and in Test Example of the present invention, polyolefin rubber and wax were mixed at a constant ratio, and the resulting mixture was heated until it became transparent. Then, while cooling the resulting composition, compatibility was measured with a cloud point at a temperature at which the resin composition was blurred. Namely, the compatibility of room temperature to 150° C. means that the hydrogenated petroleum resin of the present invention can be well mixed with other resin at a room temperature to 150° C.

Method for Manufacturing Hydrogenated Petroleum Resin

Figure 2:
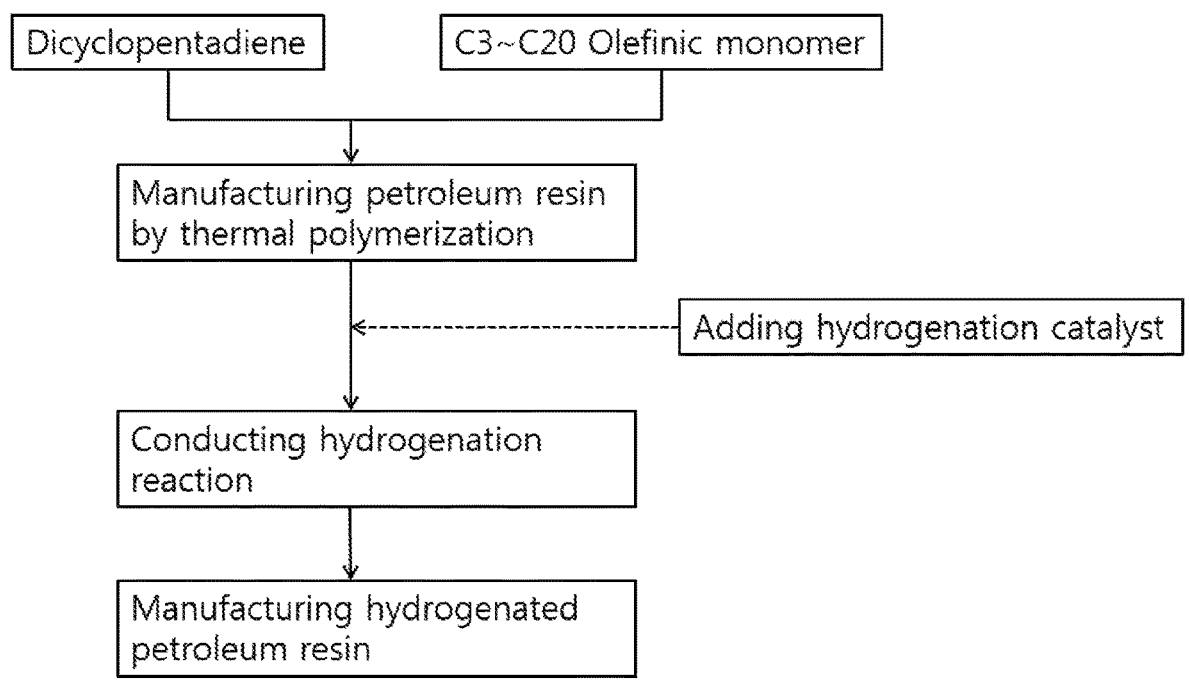
FIG. 2 is a flow chart showing a method for manufacturing the hydrogenated petroleum resin presented in the present invention.
Figure 3:
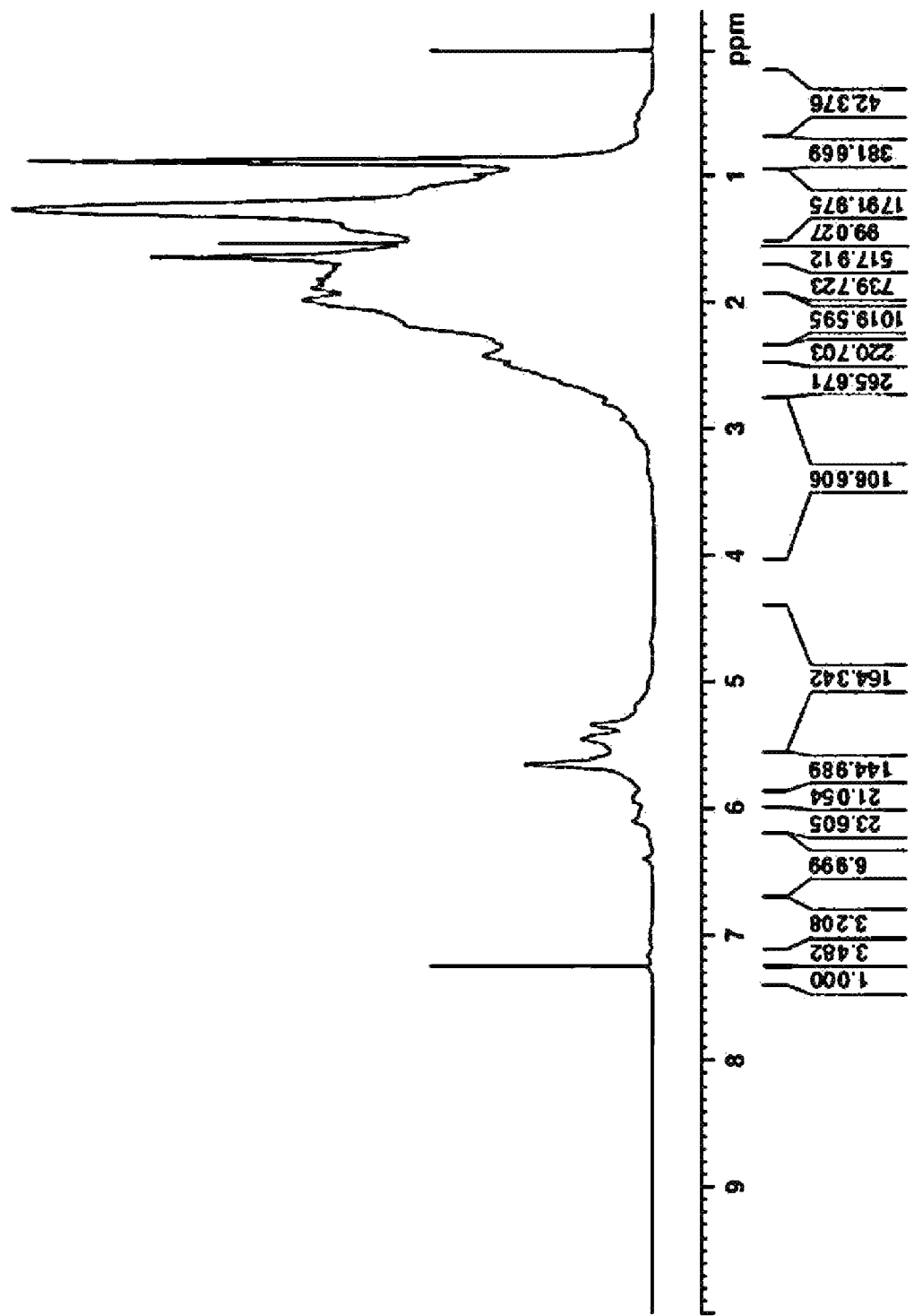
FIG. 3 is $^1$H-NMR spectrum of the petroleum resin of Example 1 according to the present invention before adding hydrogen.

The hydrogenated petroleum resin according to the present invention is manufacture by the following steps of (see FIG. 2):

thermally polymerizing dicyclopentadiene and a C3 to C20 olefinic monomer to prepare a petroleum resin; and subjecting the petroleum resin to a hydrogenation reaction with a hydrogenation catalyst to manufacture a hydrogenated petroleum resin.

Hereinafter, the method will be described in detail step by step.

(S1) Thermal Polymerization Reaction Step

First, dicyclopentadiene and a C3 to C20 olefinic monomer as a co-monomer are thermally polymerized to prepare a petroleum resin.

The olefinic monomer used as a co-monomer may be an olefin compound up to C20 as well as a C3 olefin which was conventionally used as a major ingredient of a petroleum resin. Preferably, the olefinic monomer may be a linear or branched alpha olefinic monomer.

In particular, if the alpha olefinic monomer is a linear alpha olefin, the linear alpha olefin has higher flexibility and better fluidity and structural penetration force than the branched alpha olefin. Accordingly, when used as an adhesive agent or a tackifier, high wettability to a substrate can be secured, thereby securing high adhesive force. At this time, the alpha olefinic monomer may be one or a mixture of two or more of the following monomers, but not limited thereto.

The olefinic monomer which can be used may be linear alpha-olefin such as ethylene (or ethene), propylene (or propene), 1-butene, 1-pentene, 1-hexene, 1-heptene, 1-octene, 1-decene, 1-undecene, 1-dodecene, 1-tetradecene, 1-hexadecene, 1-eicosene and the like; branched alpha-olefin such as isobutylene, 3-methyl-1-butene, 2-methyl-1-butene, 3-methyl-1-butene, 4-methyl-1-butene, 3-methyl-1-pentene, 4-methyl-1-pentene, 4-methyl-1-hexene, 5-methyl-1-hexene, dimethyl pentene, diethyl hexane and the like; and a mixture thereof, and the olefinic monomer may be used alone of as a mixture. More preferably, it may be linear alpha olefin, and most preferably it may be 1-hexene, 1-heptene, 1-octene, 1-decene, dodecene and the like in the liquid form.

For example, the reaction of the dicyclopentadiene and 1-hexene as the C6 olefin is shown in the following Reaction Formula 1.

[Reaction Formula 1]

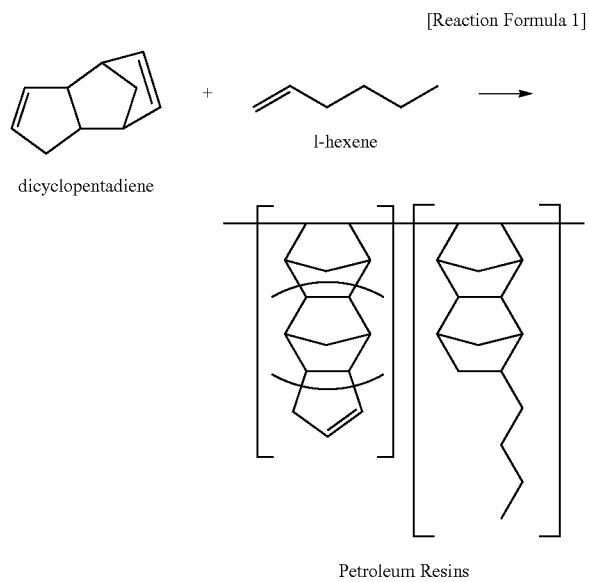

In particular, in the present invention, the polymerization of the dicyclopentadiene and the olefinic monomer is conducted by thermal polymerization not catalytic polymerization.

When the dicyclopentadiene and the olefinic monomer are heated to a certain level of heat, they themselves form radicals to initiate the reaction, and the petroleum resin is manufactured through continuous polymerization. This thermal polymerization does not use an initiator, so it can solve the problem of increase in the cost due to the use of the initiator and purity problem of the petroleum resin.

Further, in the thermal polymerization of the dicyclopentadiene and the olefinic monomer, the molar ratio of the dicyclopentadiene to the olefinic monomer is 1:0.2 to 1:0.5, preferably 1:0.25 to 1:0.45. The mole ratio is related to the physical properties of the finally obtained hydrogenated petroleum resin. If the molar ratio is less than the above range, it is difficult to manufacture a hydrogenated petroleum resin having a desired level of physical properties by using too little olefinic monomer. On the contrary, if the molar ratio is more than the above range, the content of the dicyclopentadiene is relatively reduced and the physical properties of the finally obtained hydrogenated petroleum resin are deteriorated, so that it is appropriately adjusted within the above range.

At this time, the thermal polymerization is not particularly limited in the present invention, and bulk polymerization and solution polymerization methods, preferably solution polymerization method may be used.

For solution polymerization, a solvent is used, and when this step is carried out by solution, dicyclopentadiene solution is prepared by dissolving the dicyclopentadiene in a solvent, the olefinic monomer is added to the obtained dicyclopentadiene solution, and thermal polymerization is performed.

At this time, the solvent may be any solvent which can fully dissolve the dicyclopentadiene, but not limited in the present invention. For example, it may be one selected from the group consisting of toluene, methylene chloride, hexane, xylene, trichlorobenzene, alkyl benzene, acetonitrile, dimethyl formamide, N-methyl pyrrolidone, dimethyl acetamide, dimethyl sulfoxide, gamma-butyrolactone, furfural, acetone and a mixture thereof.

The amount of the solvent may be the amount enough to fully dissolve dicyclopentadiene, and for example, it may be in a range from 2 mol to 10 mol based on dicyclopentadiene 1 mol.

The thermal polymerization is performed at a temperature at which initiation and polymerization of the dicyclopentadiene and the olefinic monomer can sufficiently take place, and the temperature can be changed depending on the type of the 71 dicyclopentadiene and the olefinic monomer.

Preferably, it is performed at 200° C. to 320° C., more preferably at 250° C. to 300° C., for 0.5 hour to 4 hours, preferably 1 hour to 2 hours. If the thermal polymerization is performed at lower than 200° C. or for less than 0.5 hour, the yield may low, and if it is performed at higher than 320° C. or for more than 4 hours, gel may be formed.

The temperature is directly related to initiation and polymerization reaction. If the temperature is lower than the above range, the initiation does not occur, and on the contrary, if the temperature exceeds the above range, decomposition of the dicyclopentadiene or the olefinic monomer as raw material or gel formation occurs, and control of polymerization speed is not easy.

Further, the reaction time is related to yield. If the time is less than the above time, the yield may low, and on the contrary, even if the reaction is conducted for a long time, it is uneconomical because there is no large increase in yield, so that it is appropriately adjusted within the above range.

In particular, by thermally polymerizing the dicyclopentadiene and the olefinic monomer, the present invention can solve the problem that it is difficult to supply raw materials of C5 olefin which was used as a main material in the conventional petroleum resin, and the problem of bad odor which could not be solved by the conventional petroleum resin. Further, when manufacturing the petroleum resin by such thermal polymerization, the catalyst removal process which has been an essential process in the cationic catalyst method, which was a conventional method for manufacturing a petroleum resin, may not be required, and in particular, it is preferred because the yield can be greatly enhanced to 90% or more.

(S2) Hydrogenation Reaction Step

Then, a hydrogenation catalyst is added to the petroleum resin manufactured above, and hydrogenation reaction is performed to manufacture a hydrogenated petroleum resin.

The hydrogenation reaction is a reaction in which hydrogen is added to an unsaturated double bond to form a single bond, and a hydrogenated petroleum resin in which all double bonds are eliminated by the hydrogenation reaction is manufactured.

For example, a step of manufacturing the hydrogenated petroleum resin manufactured from dicyclopentadiene and 1-hexene as C6 olefin is shown in the following Reaction Formula 2.

[Reaction Formula 2]

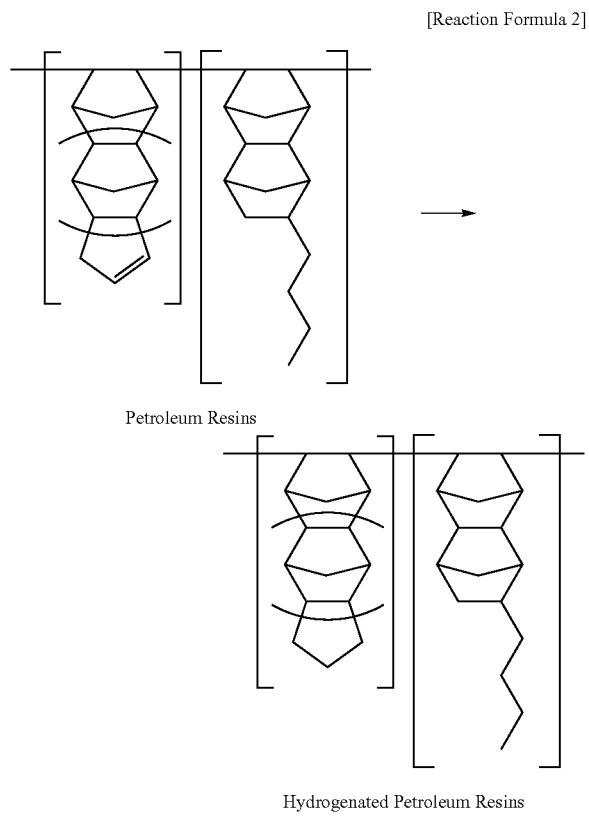

Petroleum Resins

Hydrogenated Petroleum Resins

The hydrogenation reaction is carried out by the addition of a hydrogenation catalyst, and involves a high degree of exothermic process, so that temperature control requirements are difficult and high pressure should be maintained. Preferably, the hydrogenation reaction is performed under a pressure of 50 bar to 150 bar at 150° C. to 300° C. If the temperature and the pressure are less than the above range, the hydrogenation reaction is not sufficiently performed, and on the contrary, if the temperature and the pressure over the range, molecular structure may be broken due to harsh reaction condition, so that it is appropriately adjusted within the above range.

The hydrogenation catalyst used at this time is not particularly limited in the present invention, and it may be any hydrogenation catalyst known in the art. For example, the hydrogenation catalyst may be one selected from the group consisting of Ni, Fe, Cu, Co, Mo, Pd, Rh, Pt, Nb, Au, Rd, Raney Ni and a combination thereof, and preferably it may be Pd.

The hydrogenation catalyst is used at a molar ratio of 0.001 to 0.5, preferably 0.05 to 0.2 based on dicyclopentadiene 1 mol. If it is used at less than 0.001 mol based on dicyclopentadiene 1 mol, reactivity may be poor, and if it is more than 0.5 mol, it is not economical due to use of a large amount of the catalyst.

The method for manufacturing the hydrogenated petroleum resin according to the present invention can manufacture a hydrogenated petroleum resin at a high yield through thermal polymerization, and the process can be simplified, the cost can be reduced, and it can be easily applied to the practical process.

Specifically, it is not necessary to use an expensive catalyst used in the conventional catalytic polymerization and the process of removing the catalyst after the completion of the reaction is fundamentally excluded so that the process itself is simplified and the apparatus cost and the process cost are reduced so that the production process can be improved.

The manufacturing method according to the present invention described above can manufacture a petroleum resin with highly improved bad odor at a high yield of 90% or more.

Use

The petroleum resin manufactured in the present invention can give tackifying property or adhesiveness to a hot melt adhesive agent, a pressure sensitive adhesive agent, ink, paint, paint for road marking and the like, and can be useful as an adhesive agent by mixing to various resin such as natural rubber, synthetic rubber and the like.

In addition, the present invention provides an adhesive agent composition, which comprises a petroleum resin comprising the repeating unit represented by Chemical Formula 1 and the repeating unit represented by Chemical Formula 2; at least one polymer selected from styrenic block copolymers such as styrene-isoprene block copolymer, styrene-isoprene-styrene block copolymer, styrene-butadiene block copolymer and styrene-butadiene-styrene block copolymer, and ethylene based poly olefin block copolymers such as polyethylene, polypropylene, ethylene vinyl acetate and propylene-ethylene copolymer; and at least one oil selected from the group consisting of synthetic wax such as paraffin wax and microcrystalline wax, animal natural wax, vegetable natural wax, aromatic oil, naphthenic oil and paraffinic oil.

The adhesive agent manufactured from the adhesive agent composition is characterized by having softening point of 50° C. to 150° C., and melt viscosity of 300 cps to 10,000 cps at 160° C. and 200 cps to 8,000 cps at 180° C.

If the softening point of the adhesive agent is less than 50° C., adhesive force may be deteriorated, and if it is over 150° C., it is not preferred because it is difficult to be applied to a manufacturing process. Accordingly, it is not preferred.

Further, if the melt viscosity is more than 10,000 cps at 160° C., processability may be deteriorated, if it is less than 300 cps at 160° C., adhesive force may be deteriorated, if it is more than 8,000 cps at 180° C., processability may be deteriorated, and if it is less than 200 cps at 180° C., adhesive force may be deteriorated.

The adhesive agent manufactured from the adhesive agent may be used as a hot melt adhesive (HMA) or a pressure sensitive adhesive agent (hot melt sensitive adhesive (HMPSA)).

The hot melt adhesive agent has excellent properties such as compatibility of 100° C. or lower, hardness from 30° C. to 90° C., open time from 5 sec to less than 30 sec and set time from 0.1 sec to less than 5 sec.

The pressure sensitive adhesive agent has excellent properties, for example, in Ball Tack method, it has a value of 40 cm or less in the beginning and a value of 40 cm or less after aging; in Peel strength method, it has a value of 500 gf/in or more in the beginning and a value of 500 gf/in or more after aging; in Holding power method, it has a value of 30 min or longer in the beginning and a value of 30 min or longer after aging; and in SAFT method, it has a value of 40° C. or higher in the beginning and a value of 40° C. or higher after aging. Accordingly, it can be found that it has excellent properties as a pressure sensitive adhesive agent.

In the adhesive agent according to the present invention as mentioned above, a hydrogenated petroleum resin has no double bonds by a hydrogenation reaction, and the agent is manufactured by thermal polymerization without unreacted raw materials, solvents and low molecular oligomers, resulting in improvement of bad odor caused by them. Such adhesive agent can be suitably used in a hot melt pressure sensitive adhesive agent or an adhesive agent for sanitary goods in contact with human body such as diapers, sanitary napkins, adult diapers and the like.

MODE FOR INVENTION

Hereinafter, the preferred embodiment of the present invention will be described in detail based on examples. However, the embodiments of the present invention may be modified in various ways, and the scope of the present invention should not be interpreted as being limited to the examples. The embodiments of the present invention are provided just for explaining the present invention more perfectly to those having ordinary skill in the art.

EXAMPLE

Example 1

After dissolving dicyclopentadiene (DCPD) 1.5 mol in toluene 4 mol as a solvent in a 1 L autoclave to obtain a mixture, and then 1-hexene 0.5 mol was added thereto. After fastening the reactor, thermal polymerization was performed at a temperature of 270° C. for 2 hours. After completing the reaction, the petroleum resin thus obtained was distilled at 240° C. for 5 min to recover unreacted oil to obtain the remained petroleum resin 55 g. Toluene as a hydrogenation solvent 1.5 folds more than the resin was added to the petroleum resin thus obtained 55 g to completely dissolve the resin, and then put into a 1 L autoclave.

A palladium catalyst 0.2 mol was added thereto, the reactor was fastened and a hydrogenation reaction was performed at a hydrogen pressure of 80 bar and a temperature of 230° C. for 90 min. After completing the reaction, the resulting reaction solution was distilled in a vacuum of 10 torr at 260° C. for 10 min to obtain a hydrogenated petroleum resin 50 g. Each specific ingredient and the contents thereof are shown in Table 1.

Whether the petroleum resin before hydrogenation and the petroleum resin after hydrogenation were polymerized or not was confirmed by using a nuclear magnetic resonance spectrometer (500 NMR, Bruke, 14.1 telsa). The results were shown in FIG. 3 and FIG. 4. Namely, from the $^1$H-NMR spectrum results confirming the structure of the petroleum resin before hydrogenation shown in FIG. 3, it can be found that when measuring $^1$H-NMR, a peak between 0.85 ppm to 0.95 ppm representing a methyl group (—CH$_3$) derived from 1-hexene was increased, and at the same time a peak between 1.20 ppm to 1.30 ppm representing a <—CH$_2$—> chain of 1-hexene was increased. Accordingly, it can be found that the DCPD and the 1-hexene were copolymerized.

Figure 4:
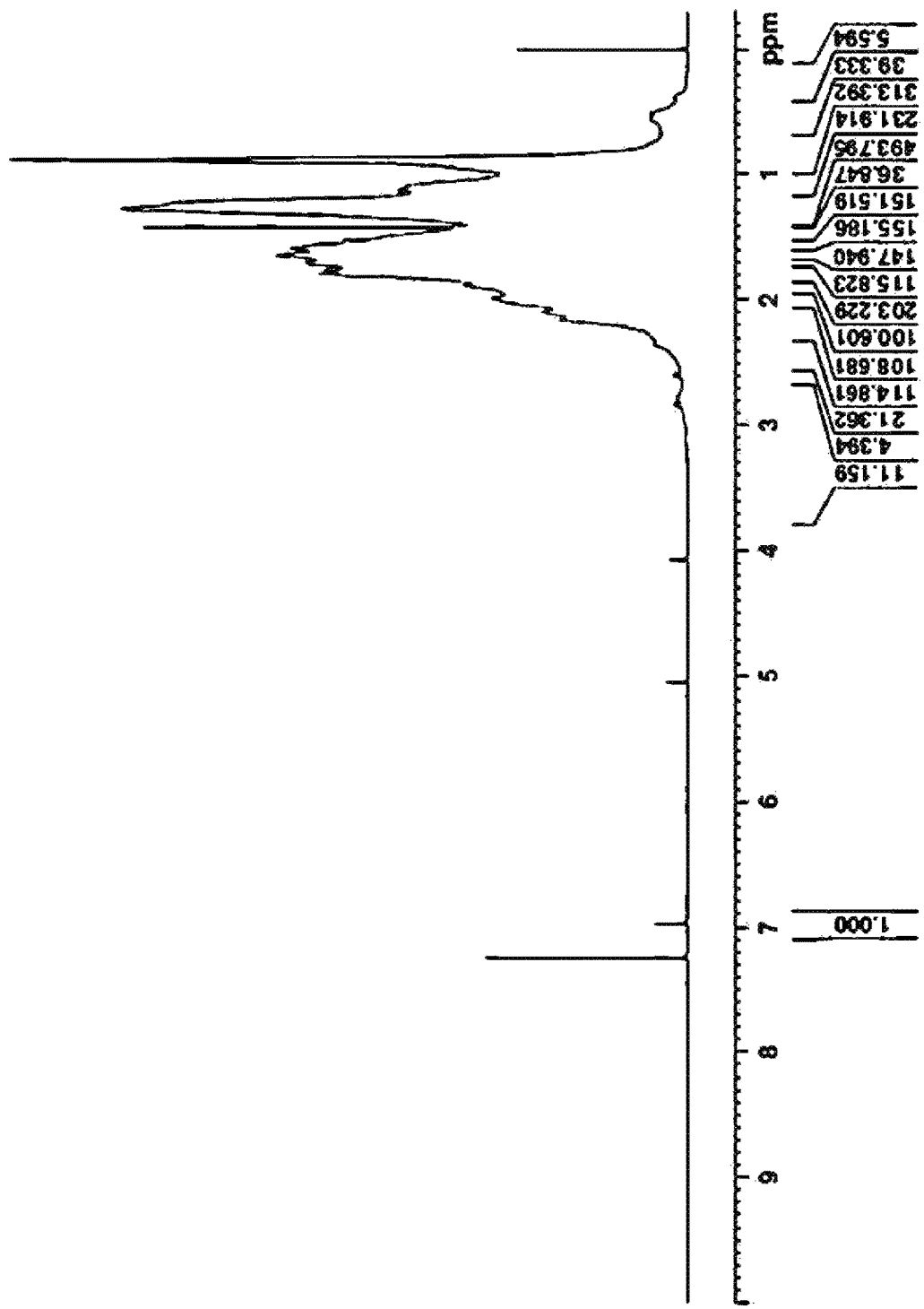
FIG. 4 is $^1$H-NMR spectrum of the petroleum resin of Example 1 according to the present invention after adding hydrogen.

Further, from the $^1$H-NMR spectrum results confirming the structure of the petroleum resin after hydrogenation shown in FIG. 4, it can be found that when measuring $^1$H-NMR, a peak between 0.85 ppm to 0.95 ppm representing a methyl group (—CH$_3$) derived from 1-hexene was increased, and at the same time a peak between 1.20 ppm to 1.30 ppm representing a <—CH$_2$—> chain of 1-hexene was increased. Accordingly, it can be found that the DCPD and the 1-hexene were copolymerized. In addition, it was confirmed that a double bond peak between 4.9 ppm to 6.5 ppm was completely eliminated. Accordingly, it can be found that the hydrogenation was completely conducted.

At this time, in the method for measuring $^1$H-NMR spectrum, a peak between 0.85 ppm to 0.95 ppm refers to a methyl group of olefin, a peak between 1.20 ppm to 1.30 ppm refers to a <—CH$_2$—> chain of olefin, and a peak between 4.9 ppm to 6.5 ppm refers to a double bond of dicyclopentadiene. As can be seen from the result of FIG. 3 and FIG. 4, by comparing values of each peak, whether the DCPD and the olefin were copolymerized and the hydrogenation reaction was conducted or note can be confirmed.

Examples 2 to 14

Petroleum resins of Example 2 to Example 14 were manufactured by the method of Example 1 according to the conditions listed in the following Table 1.

Figure 5:
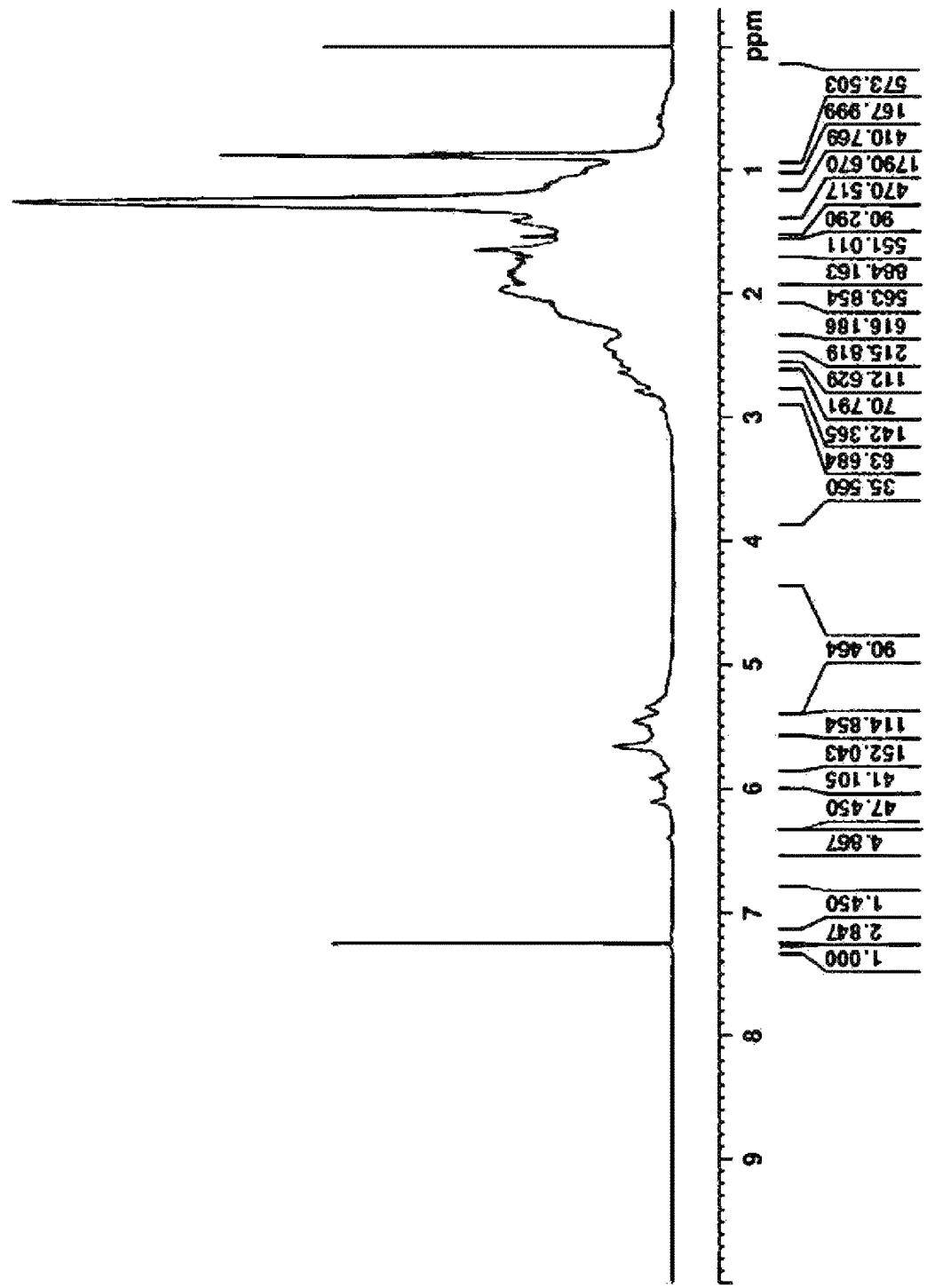
FIG. 5 is $^1$H-NMR spectrum of the petroleum resin of Example 5 according to the present invention before adding hydrogen.
Figure 6:
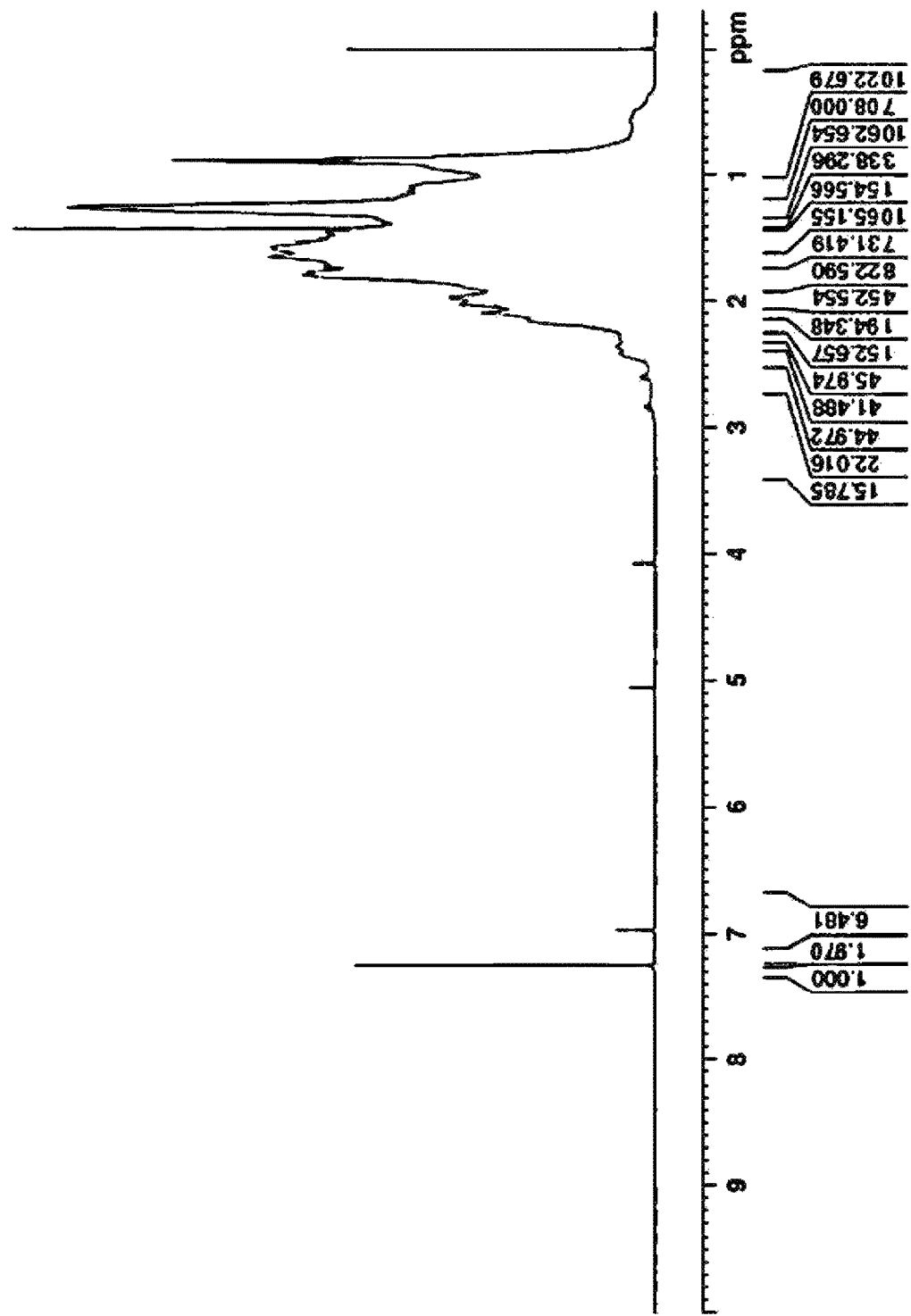
FIG. 6 is $^1$H-NMR spectrum of the petroleum resin of Example 5 according to the present invention after adding hydrogen.
Figure 7:
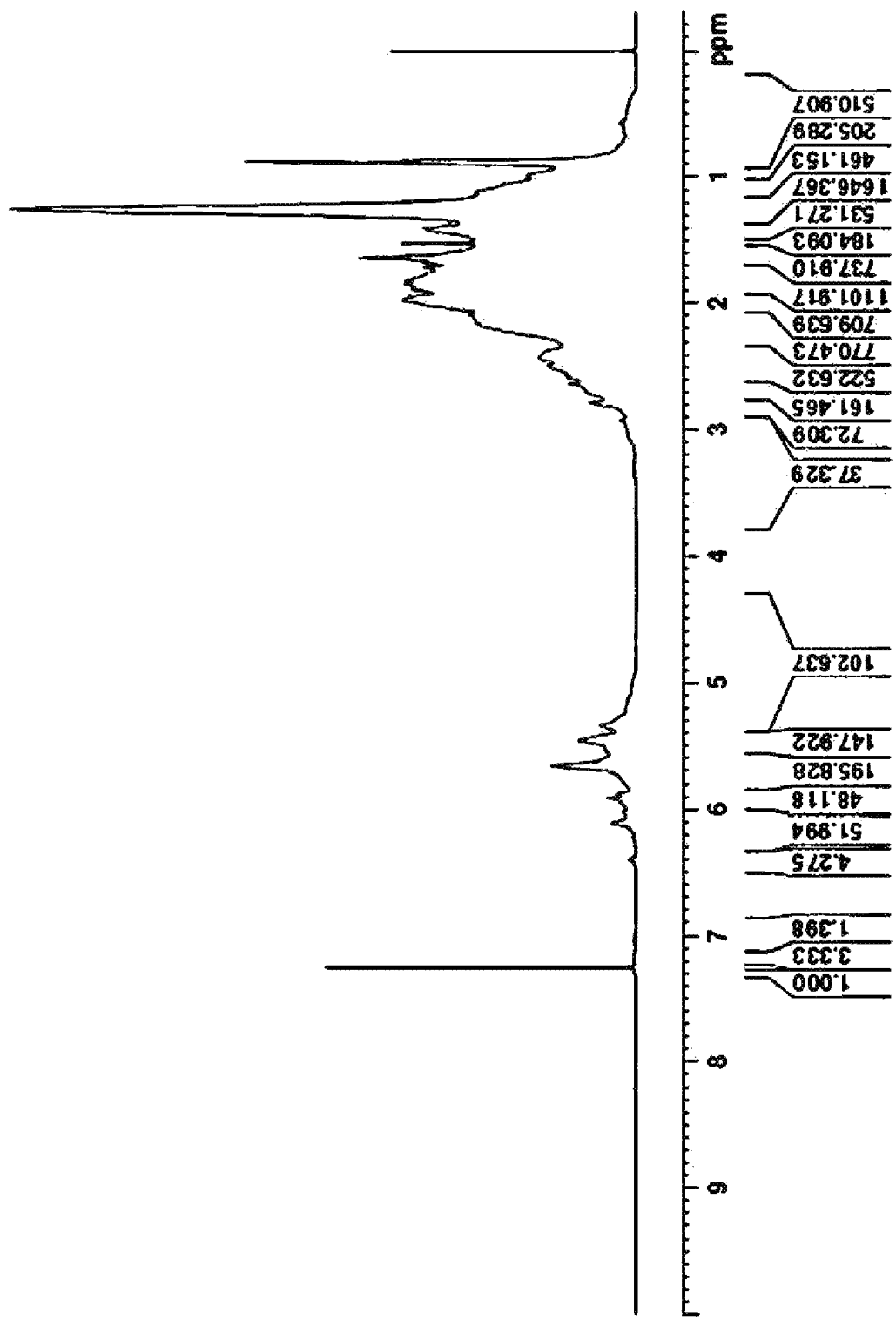
FIG. 7 is $^1$H-NMR spectrum of the petroleum resin of Example 7 according to the present invention before adding hydrogen.
Figure 8:
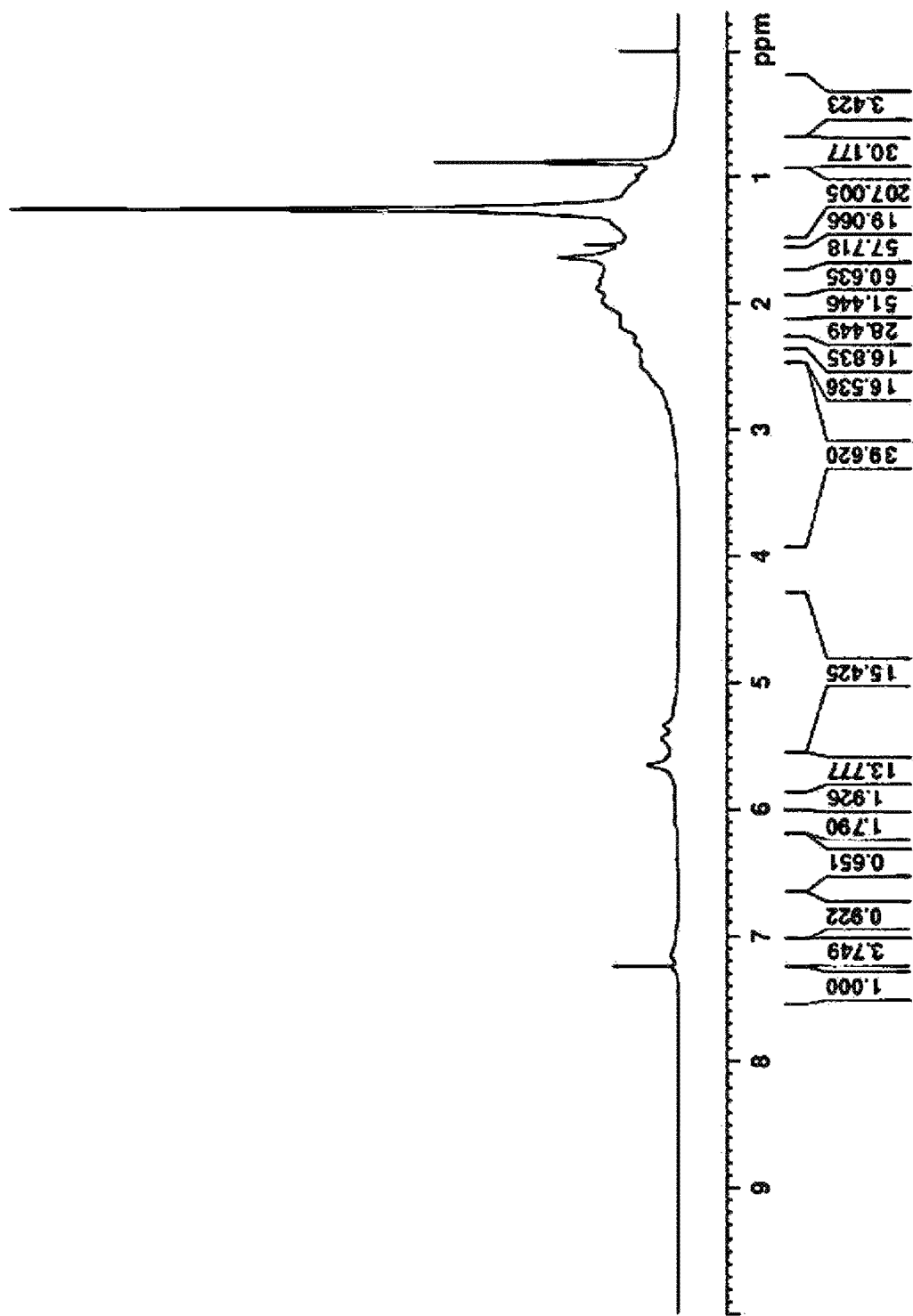
FIG. 8 is $^1$H-NMR spectrum of the petroleum resin of Example 8 according to the present invention before adding hydrogen.
Figure 9:
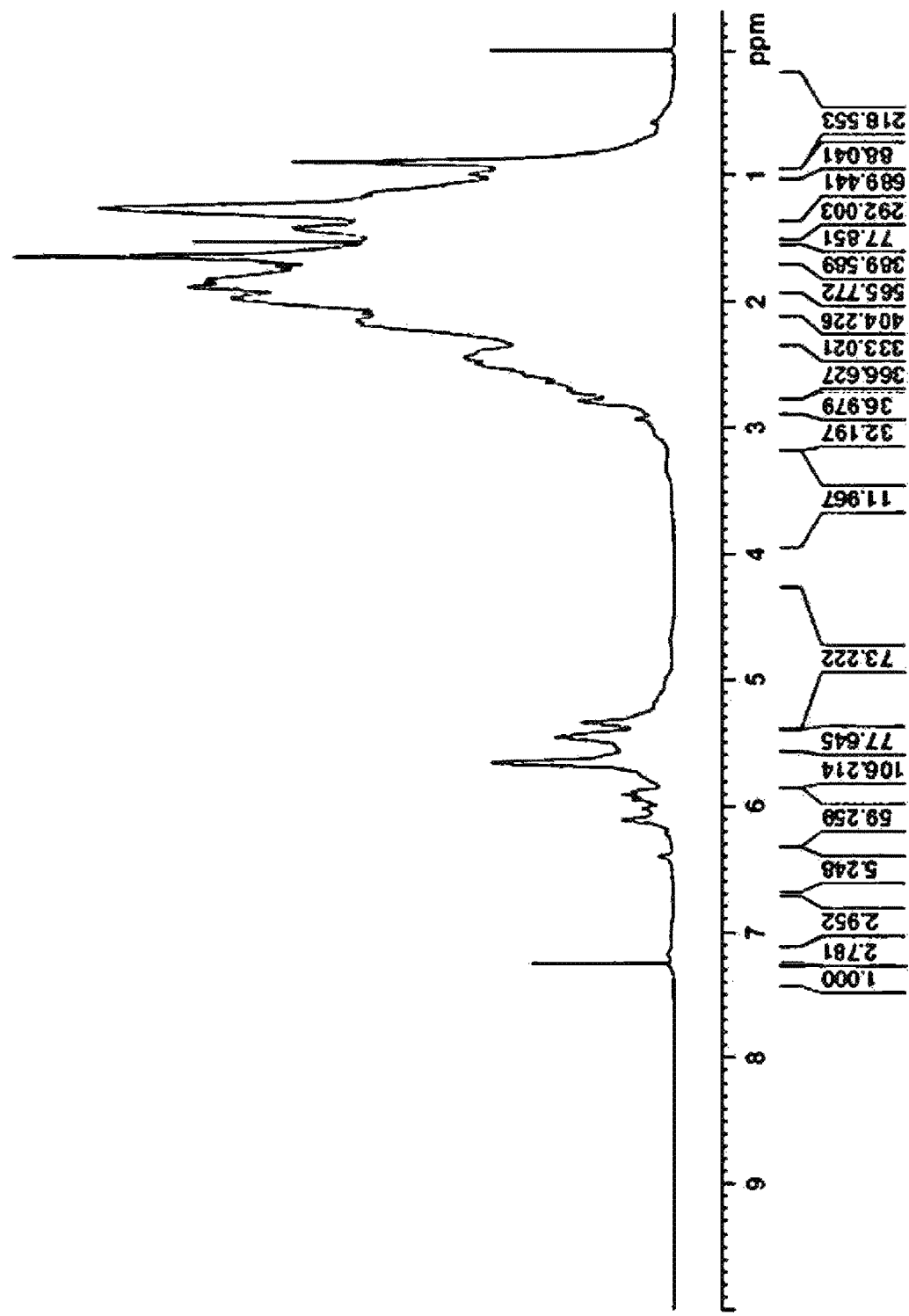
FIG. 9 is $^1$H-NMR spectrum of the petroleum resin of Example 9 according to the present invention before adding hydrogen.
Figure 10:
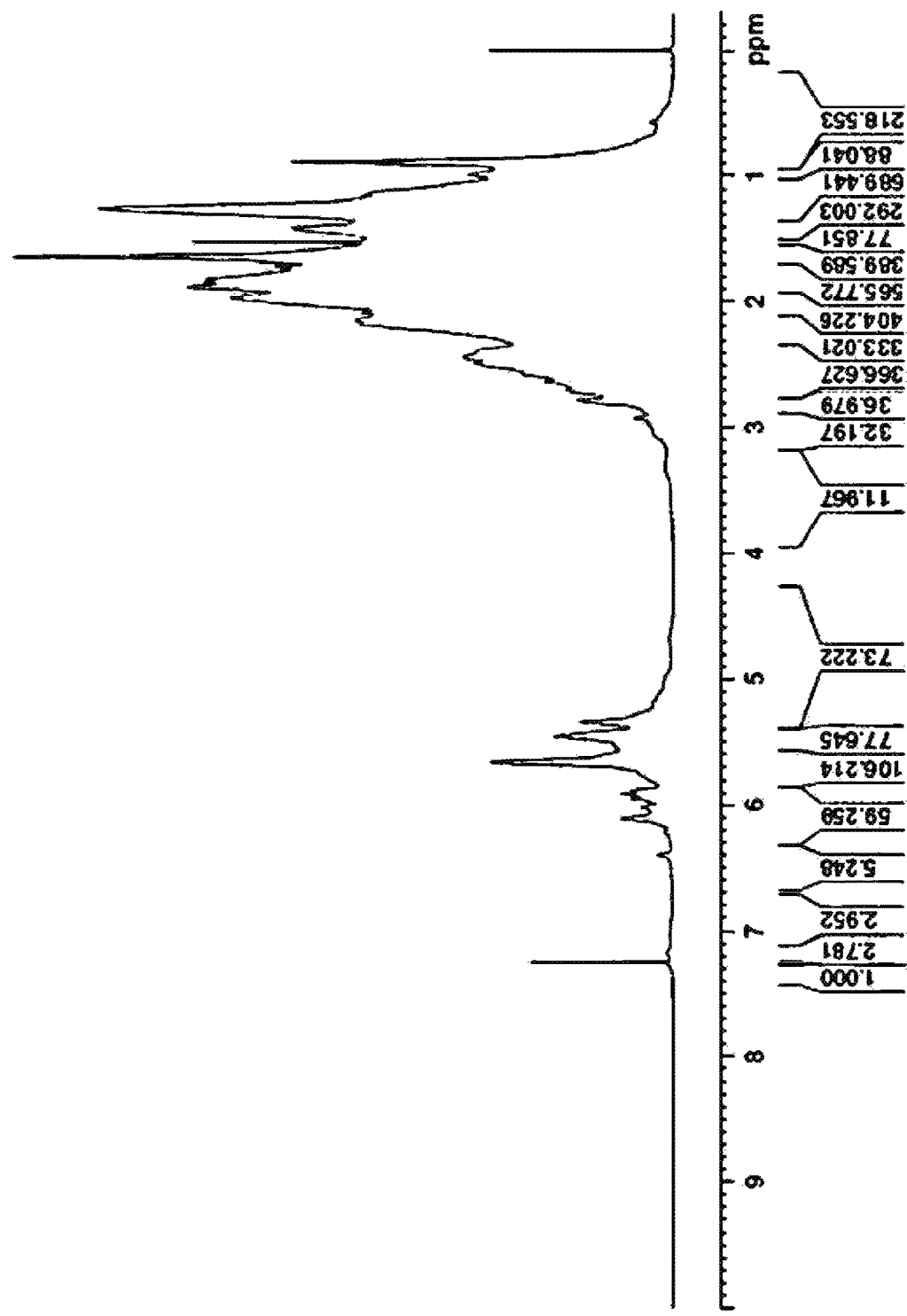
FIG. 10 is $^1$H-NMR spectrum of the petroleum resin of Comparative Example 1 according to the present invention before adding hydrogen.

At this time, the $^1$H-NMR spectrum result of the petroleum resin manufactured in Example 5 before and after hydrogenation were shown in FIG. 5 (before hydrogenation) and FIG. 6 (after hydrogenation), respectively, the $^1$H-NMR spectrum result of the petroleum resin manufactured in Example 7 before hydrogenation was shown in FIG. 7, the $^1$H-NMR spectrum result of the petroleum resin manufactured in Example 8 before hydrogenation was shown in FIG. 8, and the $^1$H-NMR spectrum result of the petroleum resin manufactured in Example 9 before hydrogenation was shown in FIG. 9.

Comparative Example 1

Dicyclopentadiene (DCPD) 2.0 mol was dissolved in toluene 4 mol as a solvent in a 1 L autoclave. After fastening the reactor, the resulting solution was reacted for 2 hours while maintaining a reaction temperature at 270° C. After completing the reaction, the petroleum resin thus obtained was distilled at 240° C. for 5 min to recover unreacted oil to obtain the remained petroleum resin 57 g.

Toluene as a hydrogenation solvent 1.5 folds more than the resin was added to the petroleum resin thus obtained 57 g to completely dissolve the resin, and then put into a 1 L autoclave. A palladium catalyst 0.2 mol was added thereto, the reactor was fastened and a hydrogenation reaction was performed at a hydrogen pressure of 80 bar and a temperature of 230° C. for 90 min. After completing the reaction, the resulting reaction solution was distilled in a vacuum of 10 torr at 260° C. for 10 min to obtain a hydrogenated petroleum resin 53 g. Each specific ingredient and the contents thereof are shown in Table 1.

Whether the petroleum resin before hydrogenation and the petroleum resin after hydrogenation were polymerized or not was confirmed by using a nuclear magnetic resonance spectrometer (500 NMR, Bruke, 14.1 telsa). The results were shown in FIG. 10 and FIG. 11.

Comparative Examples 2 and 3

Petroleum resins of Comparative Examples 2 and 3 were manufactured by the method of Comparative Example 1 according to the conditions listed in the following Table 1.

Comparative Examples 4 and 5: Catalytic Polymerization

Dicyclopentadiene (DCPD) was dissolved in toluene as a solvent 500 ml in a 1 L autoclave, and tricyclodecene (TCDE) as a polymerization regulator was added thereto. An initiator was added thereto, and then the reactor was fastened. After inserting olefin thereto, a catalyst was added to the resulting mixture and then reacted. Reaction temperature was maintained at 40° C. and the reaction was stopped after 2 hours. After completing the reaction, the petroleum resin thus obtained was mixed with water 300 g to separate the catalyst. Then the solution was distilled at 240° C. for 5 min to recover unreacted oil and then remained petroleum resin was harvested.

Toluene as a hydrogenation solvent 1.5 folds more than the resin was added to the petroleum resin thus obtained 300 g to completely dissolve the resin, and then put into a 1 L autoclave. A palladium catalyst 60 g was added thereto, the reactor was fastened and a hydrogenation reaction was performed at a hydrogen pressure of 80 bar and a temperature of 230° C. for 90 min. After completing the reaction, the resulting reaction solution was distilled in a vacuum of 5 torr at 250° C. for 5 min to obtain a hydrogenated petroleum resin. Each specific ingredient and the contents thereof are shown in Table 1.

temperature was increased at 2.5° C./min, the temperature (softening point) was measured when the ball fell down after the resin melted. The result was shown in Table 3.

(3) Molecular Weight

The polystyrene-converted weight average molecular weight and number average molecular weight were measured by gel permeation chromatography (GPC) (PL GPC-220). The hydrogenated petroleum resin to be measured was dissolved in 1,2,4-trichlorobenzene to the concentration of 0.34 wt % and 288 µl thereof was injected to GPC. As a mobile phase of GPC, 1,2,4-trichlorobenzene was used and injected at a flow rate of 1 mL/min, and then analysis was performed at 130° C. Two Guard columns and one PL 5 µl mixed-D were connected in series. While heating to 250° C. at a rate of 10° C./min, measurement was performed using a differential scanning calorimeter as a detector, and analysis was carried out under $N_2$ atmosphere up to $2^{nd}$ scan. The results were shown in Table 3.

The Mw listed in the following Table 3 refers to weight average molecular weight, and the MWD refers to Mw/Mn.

(4) Analysis of Olefin Content in Hydrogenated Petroleum Resin

The olefin content (mol %) in a hydrogenated petroleum resin was analyzed from the results of $^1$H-NMR spectrum by nuclear magnetic resonance spectrometry (Bruker, 500NMR, 14.1 telsa).

TABLE 1

| | Raw material (mol) | | | | | | | | Cata-lyst | Initi-ator | Hydro-genation Catalyst | Polymer-ization condition | | Hydroge-nation condition | |
|---|---|---|---|---|---|---|---|---|---|---|---|---|---|---|---|
| | | | | Olefin | | | | | | | | | | | |
| | DCPD | Propyl-ene | Bu-tene | Piper-ylene | 1-Hexen | 1-Oc-tene | 1-Decene | 2-dode-cene | oc-tene | (mol) $AlCl_3$ | (mol) t-BuCl | (mol) Pd | Temp. (° C.) | Time (hr) | Temp. (° C.) | Time (hr) |
| E. 1 | 1.5 | | | | 0.5 | | | | | | | 0...2 | 270 | 2 | 230 | 1.5 |
| E. 2 | 1.5 | | | | 0.5 | | | | | | | 0...2 | 280 | 2 | 230 | 1.5 |
| E. 3 | 1.7 | | | | 0.3 | | | | | | | 0...2 | 280 | 2 | 230 | 1.5 |
| E. 4 | 1.5 | | | | | 0.5 | | | | | | 0...2 | 270 | 2 | 230 | 1.5 |
| E. 5 | 1.5 | | | | | 0.5 | | | | | | 0...2 | 280 | 2 | 230 | 1.5 |
| E. 6 | 1.7 | | | | | 0.3 | | | | | | 0...2 | 280 | 2 | 230 | 1.5 |
| E. 7 | 1.5 | | | | | | 0.5 | | | | | 0...2 | 280 | 2 | 230 | 1.5 |
| E. 8 | 1.5 | | | | | | | 0.5 | | | | 0...2 | 280 | 2 | 230 | 1.5 |
| E. 9 | 1.4 | | | | | | | | 0.5 | | | 0...2 | 280 | 2 | 230 | 1.5 |
| E. 10 | 1.0 | 1.0 | | | | | | | | | | 0...2 | 280 | 2 | 230 | 1.5 |
| E. 11 | 1.0 | | 1.0 | | | | | | | | | 0...2 | 280 | 2 | 230 | 1.5 |
| E. 12 | 1.5 | | | 0.5 | | | | | | | | 0...2 | 270 | 2 | 230 | 1.5 |
| E. 13 | 1.5 | | | 0.5 | | | | | | | | 0...2 | 280 | 2 | 230 | 1.5 |
| E. 14 | 1.5 | | | 0.5 | | | | | | | | 0...2 | 290 | 2 | 230 | 1.5 |
| C. 1 | 2.0 | | | | | | | | | | | 0...2 | 270 | 2 | 230 | 1.5 |
| C. 2 | 2.0 | | | | | | | | | | | 0...2 | 280 | 2 | 230 | 1.5 |
| C. 3 | 2.0 | | | | | | | | | | | 0...2 | 290 | 2 | 230 | 1.5 |
| C. 4 | 0.8 | | | | 1.6 | | | | | 0.038 | 0.075 | 0...2 | 40 | 2 | 230 | 1.5 |
| C. 5 | 0.8 | | | | 1.6 | | | | | 0.038 | 0.075 | 0...2 | 40 | 2 | 230 | 1.5 |

Test Example

Test Example 1: Resin Property Evaluation Method (1) Yield

Yield was calculated by the following Formula.

Yield (%)=The obtained resin (g)/Total amount of the added monomers (g)*100

(2) Softening Point

The softening point was measured according to a Ring and ball softening method (ASTM E 28 standard). The sample was melted and poured on a spherical mold and the mold was mounted on a glycerin-filled beaker. A ball was placed on the spherical mold with the resin. While the (5) Color (APHA)

Color was measured according to ASTM D1544. Specifically, a hydrogenated petroleum resin 10.0 g was dissolved in toluene 10.0 g, and then put into a quartz cell with rectangular cross section (width of 5 cm, height of 4 cm and path length of 50 mm). The cell was installed in PFX195 colormeter and then the colormeter was operated to measure APHA color.

(6) Specific Gravity

Specific gravity was measured according to ASTM D71. Specifically, a hydrogenated petroleum resin 5 g was melt on a 200° C. hot plate and poured in a spherical mold. The hydrogenated petroleum resin hardened in the spherical shape was separated and put into a specific gravimeter (QUALITEST: Densimeter SD-200 L) to measure specific gravity.

(7) Bad Odor Intensity

Bad odor intensity of a petroleum resin was evaluated against 5 men and women. A petroleum resin 10 g was put into a 100 ml beaker 에 and heated in a 180° C. oven for 30 min. The hot beaker was taken out and bad odor generated from the petroleum resin was evaluated. For evaluating bad odor intensity, the tester directly scented the odor and scored from 0 point to 5 point according to the criteria of the following Table 2. The average score was calculated.

TABLE 2

| Degree | Bad odor sensitivity | Description |
|---|---|---|
| 0 | No bad odor | Relatively No odor. A state in which no odor is detected |
| 1 | Detectable bad odor | A state of being able to sense the smell but can't know what the smell is |
| 2 | General bad odor | A state of being able to know what the smell is |
| 3 | Strong odor | Easily detectable strong odor (A state of taking a unique smell of cresol in hospital) |
| 4 | Severe bad odor | Very strong smell (Smell of conventional toilet) |
| 5 | Unbearable bad odor | A state of such an intense smell that breathing is likely to stop |

<Result of Evaluating Resin Property>

The results measured by the above methods were shown in the following Table 3.

As shown in Table 3, it can be found that Examples 1 to 9 were manufactured at a yield of 90% or more. Further, it can be found that bad odor of the compositions of all Examples were significantly improved compared to the compositions of Comparative Examples. It can be found that Examples 1 to 12 in which C4 or more alkyl group was substituted showed excellent results.

Further, it can be found that Comparative Examples 4 and 5 polymerized using a cation catalyst has markedly reduced yield and significantly increased molecular weight and molecular weight distribution.

Accordingly, unlike the conventional method for manufacturing a petroleum resin in which low temperature polymerization is conducted at about 40° C. in the presence of a cationic catalyst and then hydrogenation reaction is conducted, in the method for manufacturing a petroleum resin according to the present invention, high temperature thermal polymerization is conducted at about 200° C. to 300° C. without a catalyst and then hydrogenation reaction is conducted. Accordingly, it can be found that a separate catalyst removal step is not necessary and the yield is increased to increase the productivity remarkably, and at the same time, the bad odor level is almost equal or even higher.

The results of calculating each peak area ratio from the $^1$H-NMR spectrum results of Example 1, Example 5 and Comparative Example 1 were shown in Table 4.

A1: Peak area at 0.8 ppm to 1.0 ppm in $^1$H-NMR spectrum

A2: Peak area at 1.0 ppm to 1.4 ppm in $^1$H-NMR spectrum

A3: Peak area at 1.4 ppm to 7.5 ppm in $^1$H-NMR spectrum

TABLE 3

| | Yield (%) | Softening point (° C.) | Molecular weight Mw | Molecular weight MWD | Olefin content in hydrogenated Petroleum resin (mol %) | Color APHA | Specific gravity | Bad Odor strength |
|---|---|---|---|---|---|---|---|---|
| Example. 1 | 91 | 85 | 850 | 1.8 | 21 | 20 | 1.05 | 1.0 |
| Example 2 | 100 | 100 | 1000 | 2 | 23 | 20 | 1.05 | 1.0 |
| Example 3 | 100 | 110 | 1150 | 2.1 | 13 | 30 | 1.05 | 0.9 |
| Example 4 | 90 | 88 | 870 | 1.7 | 20 | 20 | 1.05 | 0.9 |
| Example 5 | 99 | 102 | 1100 | 2 | 21 | 20 | 1.05 | 0.8 |
| Example 6 | 100 | 115 | 1210 | 2 | 12 | 30 | 1.05 | 0.7 |
| Example 7 | 100 | 105 | 1300 | 2 | 19 | 30 | 1.05 | 0.5 |
| Example 8 | 100 | 109 | 1320 | 2 | 17 | 35 | 1.05 | 0.5 |
| Example 9 | 90 | 100 | 1150 | 1.8 | 15 | 30 | 1.05 | 0.6 |
| Example 10 | 60 | 75 | 800 | 2.2 | 35 | 20 | 1.1 | 2.5 |
| Example 11 | 75 | 83 | 820 | 2.1 | 41 | 20 | 1.08 | 2.0 |
| Example 12 | 80 | 80 | 705 | 1.9 | 19 | 20 | 1.08 | 2.0 |
| Example 13 | 85 | 86 | 810 | 2.1 | 21 | 20 | 1.08 | 2.0 |
| Example 14 | 85 | 101 | 1050 | 2.2 | 22 | 20 | 1.1 | 2.2 |
| Comparative Example 1. | 90 | 100 | 550 | 1.7 | 0 | 15 | 1.1 | 3.5 |
| Comparative Example 2 | 99 | 120 | 670 | 1.9 | 0 | 20 | 1.1 | 3.5 |
| Comparative Example 3 | 100 | 160 | 700 | 2.2 | 0 | 25 | 1.1 | 3.9 |
| Comparative Example 4 | 50 | 95 | 1390 | 2.4 | 35 | 30 | 1.05 | 1.2 |
| Comparative Example 5 | 52 | 97 | 1750 | 2.7 | 33 | 30 | 1.05 | 1.0 |

TABLE 4

Figure 11:
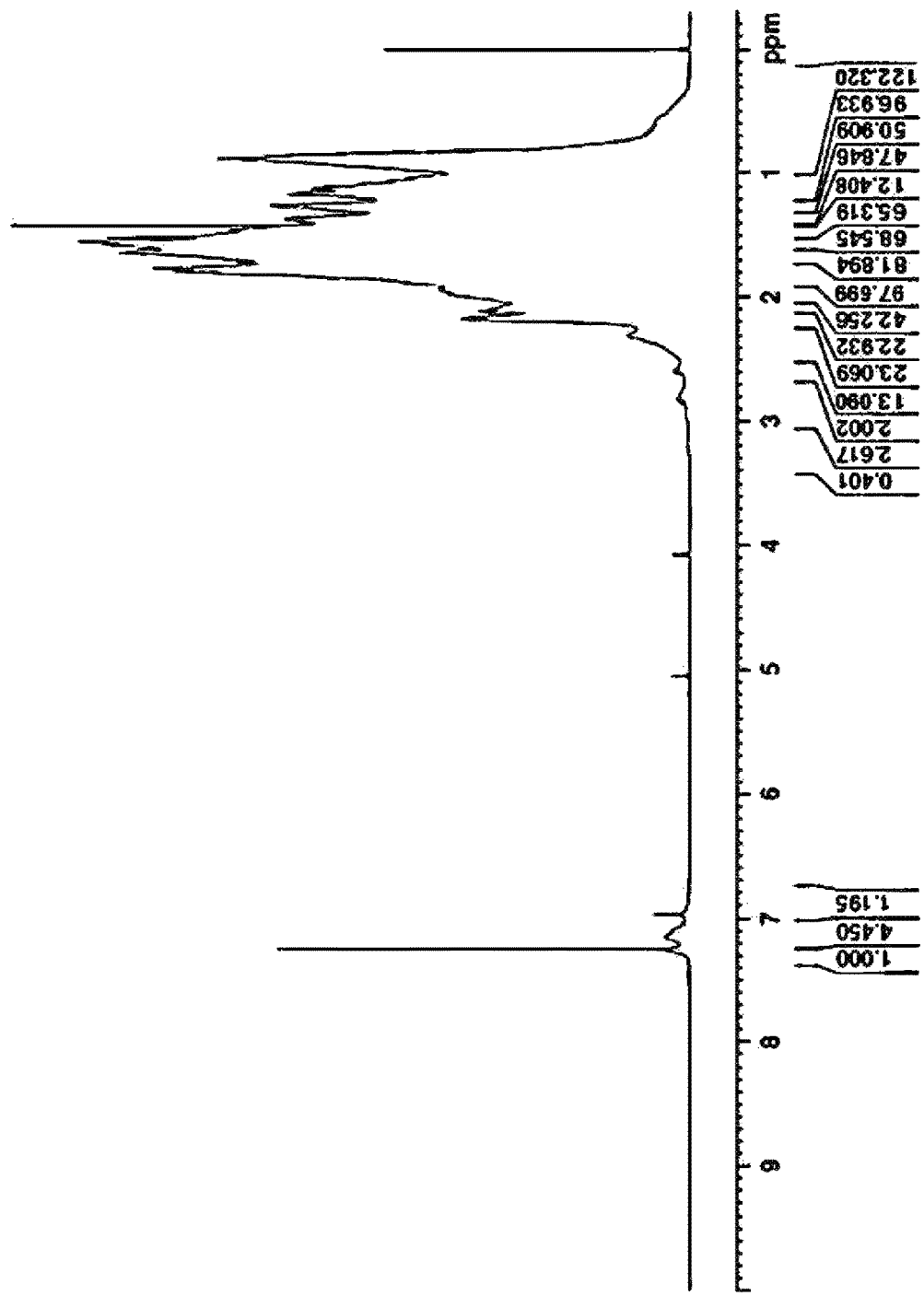
FIG. 11 is $^1$H-NMR spectrum of the petroleum resin of Comparative Example 1 according to the present invention after adding hydrogen.

| Hydrogenated petroleum resin | Area ratio parameter | | FWHM parameter | | |
|---|---|---|---|---|---|
| raw material | A1/A3 | A2/A3 | 0.85 ppm | 1.20 ppm | Figure |
| Comparative Example 1 | DCPD | 0.24 | 0.43 | >1.8 | >0.1 | FIG. 11 |
| Example 1 | Hex/DCPD | 0.27 | 0.65 | 0.08 | 0.2 | FIG. 4 |
| Example 5 | Oct/DCPD | 0.26 | 0.74 | 0.0523 | 0.1188 | FIG. 6 |

Test Example 2: Manufacture of Adhesive Agent and Measurement of Property

Performance of the hydrogenated petroleum resin manufactured in the present invention as an adhesive agent was confirmed as follows.

<Method for Evaluating Performance of Adhesive Agent>

Compatibility, viscosity and softening point were measured by the same methods used in the resin property evaluation method.

(1) Hardness (A)

Hardness was measured using a Shore A hardness tester of 124ASTM standard. A sample to be measured was place on a flat surface and the sample was pierced with a sharp portion of the hardness tester. A value measured was recorded.

(2) Open Time

Open time was measured by using a standard hot melt tester (JIT). After a certain amount of an adhesive agent was coated on a width of 5 cm×height of 5 cm corrugated cardboard, a width of 5 cm×height of 10 cm corrugated cardboard was attached thereto. The strength when the corrugated cardboard was detached therefrom was recorded in increments of 5 sec from 0 sec. When a graph was drawn, the time at which the strength was begun to fall sharply was recorded.

(3) Set Time

Set time was measured by using a standard hot melt tester (JIT). After a certain amount of an adhesive agent was coated on a width of 5 cm×height of 5 cm corrugated cardboard, a width of 5 cm×height of 10 cm corrugated cardboard was attached thereto. The strength when the corrugated cardboard was detached therefrom was recorded in increments of 0.5 sec from 0 sec. When a graph was drawn, the time at which the strength value on Y-axis was begun to become constant was recorded.

(4) Peel Strength

Peel strength was measured by using a UTM device. First, a tape was prepared by coating a sample (adhesive agent) on a PET film to a thickness of 25 micrometer. The tape was attached to a SUS-304 steel plate. The part where the PET film was attached was equipped to a UTM grip, and then the strength was measured at a rate of 30 mm/min. At this time, the numerical value input to the UTM device means adhesive force (kgf/in).

(5) Tackifying Force Evaluation: Ball Tack

Tackifying force was evaluated according to ASTM D3121 method.

A specimen tape on which an adhesive agent was coated at 20 micrometer to 30 micrometer was cut to width of 10 cm and height of 50 cm. A ball tack tester (JIS Z0237) was placed at one end and the angle was set at a standard tilt angle of 30 degree, and a steel ball No. 9 was rolled thereon. The rolling distance was measured, and the less the ball rolls, the better the performance of the tack.

(6) Adhesive Force Evaluation: Holding Power

Adhesive force was evaluated according to ASTM D3330 method.

A specimen tape on which an adhesive agent was coated at 20 micrometer to 30 micrometer was cut to width of 2 inch and height of 6 inch. The specimen was placed on a release paper, made to a size of width of 1 inch and height of 2 inch, and then attached to a cleansed SUS 304 steep plate (At this time, the specimen was attached to leave about 2 cm or more of the specimen unattached, and the part required for measurement was compressed by using a roll down device (Cheminstruments) by moving a roll back and forth once). The specimen not attached to the SUS 304 steep plate was cut with scissors so as to leave about 2 cm or more of the specimen unattached. The specimen not attached to the SUS 304 steel plate was inserted into a ring for measuring cohesion and adhered to the passing specimen. Each Two scotch tapes for fixing were attached on the front and back sides of the SUS 304 steel plate in parallel to the horizontal end of the steel plate, and then the specimen was fixed by stapling 2 times parallel between the ring for measuring cohesion and the SUS304 steel plate. The remaining specimen was cut so that the specimen was attached on the SUS 304 steel plate at a size of width of 1 inch and height of 1 inch.

The specimen was hanged on a SUS steel plate cradle in a shear test oven. A 1 kg weight was hanged on the ring for measuring holding power attached to the specimen. The time at which the weight was fallen down on a timer was recorded.

(7) Adhesive Force Evaluation: SAFT

Adhesive force was evaluated according to ASTM D3654 method.

A specimen tape on which an adhesive agent was coated at 20 micrometer to 30 micrometer was cut to width of 2 inch and height of 6 inch. The specimen was placed on a release paper, made to a size of width of 1 inch and height of 2 inch, and then attached to a cleansed SUS 304 steep plate (At this time, the specimen was attached to leave about 2 cm or more of the specimen unattached, and the part required for measurement was compressed by using a roll down device (Cheminstruments) by moving a roll back and forth once). The specimen not attached to the SUS 304 steep plate was cut with scissors so as to leave about 2 cm or more of the specimen unattached. The specimen not attached to the SUS 304 steel plate was inserted into a ring for measuring cohesion and adhered to the passing specimen. Each Two scotch tapes for fixing were attached on the front and back sides of the SUS 304 steel plate in parallel to the horizontal end of the steel plate, and then the specimen was fixed by stapling 2 times parallel between the ring for measuring cohesion and the SUS304 steel plate. The remaining specimen was cut so that the specimen was attached on the SUS 304 steel plate at a size of width of 1 inch and height of 1 inch.

The specimen was hanged on a SUS steel plate cradle in a shear test oven. A 1 kg weight was hanged on the ring for measuring holding power attached to the specimen. While increasing the oven temperature at a rate of 0.4° C./min, the time at which the weight was fallen down on a timer was recorded.

(8) Heat Resistance Evaluation

A 10 g sample was weighed in a test tube and aged in an 180° C. oven. After 24 hours, the heat resistance was evaluated by Gardner color scale. Gardner color has a total of 18 step colors and the color step of the nearest color to the naked eyes was recorded.

(9) Viscosity

A viscometer (Brookfield) was used. HT-2DB chamber was used and a sample of 10.5 was put into a spindle No. 27. The temperature was raised to the temperature desired for measurement and the sample was stabilized for 30 min. Stirring was started from stirring axis RPM of 0.5 and the viscosity value when torque value was 50% was recorded.

(10) Softening Point

The softening point was measured according to a Ring and ball softening method (ASTM E 28 standard). The sample was melted and poured on a spherical mold and the mold was mounted on a glycerin-filled beaker. A ball was placed on the spherical mold with the resin. While the temperature was increased at 2.5° C./min, the temperature (softening point) was measured when the ball fell down after the resin melted. The result was shown in Table 3.

Test Example 3: Manufacture of me-PP Based HMPSA (Adhesive Agent A) and Measurement of Property A mixture 100 parts by weight, which comprises Infuse 9807 (metallocene catalyzed ethylene based polyolefin block copolymer, Dow chemical) as a polymer 20 wt %, KL-240 (Michang Oil Ind. Co., Ltd.) as an oil 20 wt % and a petroleum resin used in Examples and Comparative Examples 60 wt %, was mixed with an antioxidant (Songwon Songnox 1010) 0.75 part by weight to manufacture adhesive agents A (HMPSA) of Examples 2, 6, 8 and 13 and Comparative Example 1 as a me-PE hot melt pressure sensitive adhesive (HMPSA).

Manufacture was conducted by putting the above four raw materials (petroleum resin, polymer, oil, antioxidant) in a 100 ml beaker and then stirring thereof at 180° C. for 4 hours, and detailed part by weight and the results of property evaluation were shown in Table 5. At this time, in the following table, *Aged refers to the result measured after standing each sample at 70° C. for 3 days.

TABLE 5

| | | | Adhesive agent A | | | | | |
|---|---|---|---|---|---|---|---|---|
| | | | Example 2 | Example 6 | Example 8 | Example 9 | Example 13 | Comparative Example 1 |
| me-PP based HMPSA Composition (wt %) | Hydrogenated Petroleum Resin (wt %) | Example 2 | 60 | | | | | |
| | | Example 6 | | 60 | | | | |
| | | Example 8 | | | 60 | | | |
| | | Example 9 | | | | 60 | | |
| | | Example 13 | | | | | 60 | |
| | | Comparative Example 1 | | | | | | 60 |
| | Polymer (wt %) | Infuse 9807 | 20 | 20 | 20 | 20 | 20 | 20 |
| | Oil (wt %) | KL-240 | 20 | 20 | 20 | 20 | 20 | 20 |
| | Antioxidant | Songnox 1010 | | | 0.75 part by weight | | | |
| HMPSA properties | Softening point (° C.) | | 103.5 | 104 | 104 | 101 | 101 | 103.5 |
| | Viscosity (cps) | 160° C. | 5153 | 5241 | 5198 | 5185 | 3854 | 4951 |
| | | 180° C. | 2878 | 2954 | 2869 | 2854 | 2538 | 2806 |
| | Ball Tack (Ball No. 9) | Initial | 9 | 20 | 30 | 15 | 25 | 24 |
| | | *Aged | 14 | 26 | 40 | 19 | 35 | 34 |
| | Peel Strength (gf/in, at SUS) | Initial | 1952 | 2107 | 2366 | 1852 | 1260 | 1285 |
| | | *Aged | 1598 | 1918 | 1538 | 1452 | 1205 | 1220 |
| | Holding Power (min, 30° C.) | Initial | 682 | 754 | 3675 | 582 | 135 | 170 |
| | | *Aged | 542 | 685 | 2610 | 482 | 105 | 152 |
| | SAFT (° C., at SUS, Ramp 0.4° C./min) | Initial | 49 | 51 | 56 | 49 | 45 | 47 |
| | | *Aged | 49 | 49 | 55 | 48 | 44 | 46 |
| | Gadner Color | 180° C. *24 hors | 5 | 5 | 4 | 5 | 7 | 8 |
| | Bad odor strength | | 1.1 | 1.0 | 1.0 | 1.0 | 2.3 | 2.4 |

Test Example 4: Manufacture of me-PP Based HMPSA (Adhesive Agent B) and Measurement of Property A mixture 100 parts by weight, which comprises Vistamaxx 6202 (metallocene catalyzed poly propylene, Exxonmobil chemical) 20 wt % and Vestoplast 703 (Amorphous propylene-ethylene copolymer, Evonik) 7.5 wt % as a polymer 20 wt %, KL-240 (Michang Oil Ind. Co., Ltd.) as an oil 22.5 wt % and a petroleum resin used in Examples and Comparative Examples 50 wt %, was mixed with an antioxidant (Songwon Songnox 1010) 0.75 part by weight to manufacture adhesive agents B (HMPSA) of Examples 2, 6, 8, 9 and 13 and Comparative Example 1 as a HMPSA adhesive agent (me-PP based HMPSA).

Manufacture was conducted by putting the above four raw materials (petroleum resin, polymer, oil, antioxidant) in a 100 ml beaker and then stirring thereof at 180° C. for 4 hours, and detailed part by weight and the results of property evaluation were shown in Table 6.

Test Example 5: Manufacture of SIS Based HMPSA (Adhesive Agent C) and Measurement of Property A mixture 100 parts by weight, which comprises SIS D-1161 (Styrene-Isoprene-Styrene Block Colpolymer, Kraton polymer) as a polymer 25 wt %, KL-240 (Michang Oil Ind. Co., Ltd.) as an oil 18 wt % and a petroleum resin used in Examples and Comparative Examples 57 wt %, was mixed with an antioxidant (Songwon Songnox 1010) 0.75 part by weight to manufacture adhesive agents C (HMPSA) of Examples 2, 6, 8, 9 and 13 and Comparative Example 1 as a HMPSA adhesive agent (SIS based HMPSA).

Manufacture was conducted by putting the above four raw materials (petroleum resin, polymer, oil, antioxidant) in a 100 ml beaker and then stirring thereof at 180° C. for 4 hours, and detailed part by weight and the results of property evaluation were shown in Table 7.

TABLE 6

| | | | Adhesive agent B | | | | | |
|---|---|---|---|---|---|---|---|---|
| | | | Example 2 | Example 6 | Example 8 | Example 9 | Example 13 | Comparative Example 1 |
| me-PE based HMPSA Composition (wt %) | Hydrogenated Petroleum Resin (wt %) | Example 2 | 50 | | | | | |
| | | Example 6 | | 50 | | | | |
| | | Example 8 | | | 50 | | | |
| | | Example 9 | | | | 50 | | |
| | | Example 13 | | | | | 50 | |
| | | Comparative Example 1 | | | | | | 05 |
| | Polymer (wt %) | Vistamaxx 6202 | 20 | 20 | 20 | 20 | 20 | 20 |
| | | Vestoplast 703 | 7.5 | 7.5 | 7.5 | 7.5 | 7.5 | 7.5 |
| | Oil (wt %) | KL-240 | 22.5 | 22.5 | 22.5 | 22.5 | 22.5 | 22.5 |
| | Antioxidant | Songnox 1010 | | | 0.75 part by weight | | | |
| HMPSA properties | Softening point (° C.) | | 89 | 92 | 91 | 90 | 85 | 88 |
| | Viscosity (cps) | 160° C. | 8950 | 8152 | 9080 | 8502 | 7521 | 8065 |
| | | 180° C. | 4780 | 5186 | 5100 | 4950 | 3852 | 4580 |
| | Ball Tack (Ball No. 9) | Initial | 11.0 | 17.0 | 20 | 12 | 11 | 11.0 |
| | | *Aged | 10 | 14 | 25 | 11 | 11 | 12 |
| | Peel Strength (gf/in, at SUS) | Initial | 900 | 1238 | 1352 | 850 | 752 | 800 |
| | | *Aged | 750 | 1070 | 1242 | 750 | 582 | 651 |
| | Holding Power (min, 30° C.) | Initial | 85 | 141 | 165 | 80 | 68 | 74 |
| | | *Aged | 66 | 121 | 138 | 60 | 65 | 57 |
| | SAFT (° C., at SUS, Ramp 0.4° C./min) | Initial | 42 | 43 | 50 | 41 | 40 | 42 |
| | | *Aged | 44 | 48 | 49 | 40 | 40 | 45 |
| | Gadner Color | 180° C. *24 hors | 6 | 6 | 6 | 7 | 9 | 9 |
| | Bad odor strength | | 1.4 | 1.4 | 1.3 | 1.4 | 2.2 | 1.8 |

In the above table, *Aged refers to the result measured after standing each sample at 70° C. for 3 days.

TABLE 7

|  |  |  | Adhesive agent C | | | | | |
|---|---|---|---|---|---|---|---|---|
|  |  |  | Example 2 | Example 6 | Example 8 | Example 9 | Example 13 | Comparative Example 1 |
| SIS based HMPSA Composition (wt %) | Hydrogenated Petroleum Resin (wt %) | Example 2 | 57 |  |  |  |  |  |
|  |  | Example 6 |  | 57 |  |  |  |  |
|  |  | Example 8 |  |  | 57 |  |  |  |
|  |  | Example 9 |  |  |  | 57 |  |  |
|  |  | Example 13 |  |  |  |  | 57 |  |
|  |  | Comparative Example 1 |  |  |  |  |  | 57 |
|  | Polymer (wt %) | SIS D-1161 | 25 | 25 | 25 | 25 | 25 | 25 |
|  | Oil (wt %) | KL-240 | 18 | 18 | 18 | 18 | 18 | 18 |
|  | Antioxidant | Songnox 1010 | 0.75 part by weight | | | | | |
| HMPSA properties | Softening point (° C.) |  | 103.5 | 104 | 104 | 102 | 101 | 103.5 |
|  | Viscosity (cps) | 160° C. | 5153 | 5241 | 5198 | 4952 | 3854 | 4951 |
|  |  | 180° C. | 2878 | 2954 | 2869 | 2752 | 2538 | 2806 |
|  | Ball Tack (Ball No. 9) | Initial | 5.1 | 8.4 | 10.5 | 8 | 6.5 | 6.4 |
|  |  | *Aged | 8.1 | 12.6 | 17 | 13 | 8.1 | 8.3 |
|  | Peel Strength (gf/in, at SUS) | Initial | 1338 | 1718 | 1958 | 1352 | 1310 | 1332 |
|  |  | *Aged | 1355 | 1353 | 1524 | 1405 | 1398 | 1438 |
|  | Holding Power (min, 30° C.) | Initial | 1020 | 1920 | 2554 | 592 | 293 | 383 |
|  |  | *Aged | 2054 | 3396 | 3514 | 1155 | 538 | 674 |
|  | SAFT (° C., at SUS, Ramp 0.4° C./min) | Initial | 53 | 56 | 68 | 50 | 49 | 51 |
|  |  | *Aged | 62 | 64 | 65 | 51 | 52 | 56 |
|  | Gadner Color | 180° C. *24 hors | 6 | 6 | 5 | 6 | 9 | 10 |
|  | Bad odor strength |  | 1.5 | 1.1 | 1.1 | 1.6 | 3.5 | 3 |

Test Example 6: Manufacture of me-PP Based HMA (Adhesive Agent D) and Measurement of Property Affinity 1950GA (metallocene catalyzed poly ethylene, Dow chemical) as a polymer 40 wt %, Sasol C-80 (Sasol) 20 wt % as a wax and a petroleum resin used in Examples and Comparative Examples 40 wt % were mixed to manufacture adhesive agents D (HMA) of Examples 2, 6, 7, 8 and 13 and Comparative Examples 1, 2 and 4 as a HMA adhesive agent (me-PE based HMA).

Manufacture was conducted by putting the above four raw materials (petroleum resin, polymer, oil, antioxidant) in a 100 ml beaker and then stirring thereof at 180° C. for 1 hour, and detailed part by weight and the results of property evaluation were shown in Table 8.

TABLE 8

|  |  |  | Adhesive agent D | | | | | | | |
|---|---|---|---|---|---|---|---|---|---|---|
|  |  |  | Exam. 2 | Exam. 6 | Exam. 7 | Exam. 8 | Exam. 13 | Comp. Exam. 1 | Comp. Exam. 2 | Comp. Exam. 4 |
| me-PE based HMA Composition (wt %) | Hydrogenated Petroleum Resin | Exam. 2 | 40 |  |  |  |  |  |  |  |
|  |  | Exam. 6 |  | 40 |  |  |  |  |  |  |
|  |  | Exam. 7 |  |  | 40 |  |  |  |  |  |
|  |  | Exam. 8 |  |  |  | 40 |  |  |  |  |
|  |  | Exam. 13 |  |  |  |  | 40 |  |  |  |
|  |  | Comp. Exam. 1 |  |  |  |  |  | 40 |  |  |

TABLE 8-continued

| | | | \multicolumn{5}{c}{Adhesive agent D} | | | |
|---|---|---|---|---|---|---|---|---|---|---|
| | | | Exam. 2 | Exam. 6 | Exam. 7 | Exam. 8 | Exam. 13 | Comp. Exam. 1 | Comp. Exam. 2 | Comp. Exam. 4 |
| | | Comp. Exam. 2 | | | | | | | 40 | |
| | | Comp. Exam. 4 | | | | | | | | 40 |
| | Polymer | Affinity 1950 GA | 40 | 40 | 40 | 40 | 40 | 40 | 40 | 40 |
| | Wax | Sasol C-80 | 20 | 20 | 20 | 20 | 20 | 20 | 20 | 20 |
| HMA Properties | Softening point (° C.) | | 87.8 | 89 | 89 | 88.9 | 85 | 89.2 | 91 | 89 |
| | Viscosity (cps) | 160° C. | 1641 | 1750 | 1685 | 1670 | 1258 | 1718 | 1952 | 1718 |
| | | 180° C. | 996 | 1120 | 1054 | 1026 | 850 | 1046 | 1125 | 1046 |
| | Adhesion Properties | Hardness (HAD) | 38 | 38 | 38 | 39 | 35 | 32 | 35 | 32 |
| | | Open time (sec) | 18 | 18 | 18 | 19 | 13 | 14 | 15 | 16 |
| | | Set time (sec) | 0.7 | 0.6 | 0.5 | 0.5 | 1.5 | 0.9 | 1.2 | 1.2 |
| Thermal properties | Gadner color | 180° C. *24 hors | 7 | 7 | 7 | 7 | 10 | 10 | 9 | 10 |
| | Bad odor strength | | 1.3 | 1.1 | 1.1 | 1.0 | 3.5 | 3 | 3.3 | 2.1 |

Test Example 7: Manufacture of EVA Based HMA (Adhesive Agent E) and Measurement of Property EVA 28/400 (Ethylene Vinyl Acetate, VA contents 28%, MI 400, Arkema) as a polymer 40 wt %, Sasol C-80 (Sasol) 20 wt % as a wax and a petroleum resin used in Examples and Comparative Examples 40 wt % were mixed to manufacture adhesive agents E (HMA) of Examples 2, 6, 7, 8 and 13 and Comparative Examples 1, 2 and 4 as a HMA adhesive agent (EVA based HMA).

Manufacture was conducted by putting the above four raw materials (petroleum resin, polymer, oil, antioxidant) in a 100 ml beaker and then stirring thereof at 180° C. for 1 hour, and detailed part by weight and the results of property evaluation were shown in Table 9.

TABLE 9

| | | | \multicolumn{5}{c}{Adhesive agent E} | | | |
|---|---|---|---|---|---|---|---|---|---|---|
| | | | Exam. 2 | Exam. 6 | Exam. 7 | Exam. 8 | Exam. 13 | Comp. Exam. 1 | Comp. Exam. 2 | Comp. Exam. 4 |
| EVA based HMA Composition (wt %) | Hydrogenated Petroleum Resin | Exam. 2 | 40 | | | | | | | |
| | | Exam. 6 | | 40 | | | | | | |
| | | Exam. 7 | | | 40 | | | | | |
| | | Exam. 8 | | | | 40 | | | | |
| | | Exam. 13 | | | | | 40 | | | |
| | | Comp. Exam. 1 | | | | | | 40 | | |
| | | Comp. Exam. 2 | | | | | | | 40 | |
| | | Comp. Exam. 4 | | | | | | | | 40 |
| | Polymer | EVA (28/400) | 40 | 40 | 40 | 40 | 40 | 40 | 40 | 40 |
| | Wax | Sasol C-80 | 20 | 20 | 20 | 20 | 20 | 20 | 20 | 20 |
| HMA Properties | Softening point (° C.) | | 89.5 | 91.4 | 89 | 88.9 | 87 | 89.2 | 92 | 89 |
| | Viscosity (cps) | 160° C. | 1250 | 1719 | 1685 | 1685 | 1190 | 1195 | 1684 | 1210 |
| | | 180° C. | 688 | 1040 | 958 | 987 | 587 | 589 | 1021 | 595 |

TABLE 9-continued

| | | | \multicolumn{8}{c}{Adhesive agent E} |
|---|---|---|---|---|---|---|---|---|---|---|
| | | | Exam. 2 | Exam. 6 | Exam. 7 | Exam. 8 | Exam. 13 | Comp. Exam. 1 | Comp. Exam. 2 | Comp. Exam. 4 |
| | Adhesion Properties | Hardness (HAD) | 72 | 74 | 73 | 73 | 72 | 72 | 75 | 75 |
| | | Open time (sec) | 16 | 15 | 15 | 17 | 14 | 14 | 14 | 13 |
| | | Set time (sec) | 0.5 | 0.6 | 0.8 | 0.9 | 1 | 0.9 | 0.9 | 1.2 |
| Thermal properties | Gadner color | 180° C. *24 hors | 8 | 7 | 7 | 7 | 9 | 11 | 9 | 9 |
| | Bad odor strength | | 3.8 | 3.5 | 3.5 | 3.5 | 4.9 | 4.8 | 4.5 | 4.2 |

Test Example 8: Manufacture of APAO Hot Melt Adhesive Agent (EVA Based HMA, Adhesive Agent F) and Measurement of Property Vestoplast 703 (Amorphous propylene-ethylene copolymer, Evonik) as a polymer 40 wt %, Sasol C-80 (Sasol) 20 wt % as a wax and a petroleum resin used in Examples and Comparative Examples 40 wt % were mixed to manufacture adhesive agents F (HMA) of Examples 2, 6, 7, 8 and 13 and Comparative Examples 1, 2 and 4 as a HMA adhesive agent (APAO based HMA).

Manufacture was conducted by putting the above four raw materials (petroleum resin, polymer, oil, antioxidant) in a 100 ml beaker and then stirring thereof at 180° C. for 1 hour, and detailed part by weight and the results of property evaluation were shown in Table 10.

TABLE 10

| | | | \multicolumn{8}{c}{Adhesive agent F} |
|---|---|---|---|---|---|---|---|---|---|---|
| | | | Exam. 2 | Exam. 6 | Exam. 7 | Exam. 8 | Exam. 13 | Comp. Exam. 1 | Comp. Exam. 2 | Comp. Exam. 4 |
| APAO based HMA Composition (wt %) | Hydrogenated Petroleum Resin | Exam. 2 | 40 | | | | | | | |
| | | Exam. 6 | | 40 | | | | | | |
| | | Exam. 7 | | | 40 | | | | | |
| | | Exam. 8 | | | | 40 | | | | |
| | | Exam. 13 | | | | | 40 | | | |
| | | Comp. Exam. 1 | | | | | | 40 | | |
| | | Comp. Exam. 2 | | | | | | | 40 | |
| | | Comp. Exam. 4 | | | | | | | | 40 |
| | Polymer | Vestoplast 703 | 40 | 40 | 40 | 40 | 40 | 40 | 40 | 40 |
| | Wax | Sasol C-80 | 20 | 20 | 20 | 20 | 20 | 20 | 20 | 20 |
| HMA Properties | Softening point (° C.) | | 99 | 100 | 99 | 100 | 99 | 99 | 101 | 99 |
| | Viscosity (cps) | 160° C. | 525 | 521 | 525 | 579 | 495 | 512 | 605 | 511 |
| | | 180° C. | 310 | 352 | 325 | 364 | 284 | 305 | 351 | 302 |
| | Adhesion Properties | Hardness (HAD) | 38 | 41 | 40 | 39 | 35 | 32 | 34 | 32 |
| | | Open time (sec) | 16 | 18 | 17 | 18 | 12 | 12 | 12 | 13 |
| | | Set time (sec) | 0.8 | 0.8 | 0.8 | 0.9 | 1 | 0.9 | 0.9 | 1.2 |
| Thermal properties | Gadner color | 180° C. *24 hors | 7 | 7 | 7 | 7 | 8 | 11 | 9 | 11 |
| | Bad odor strength | | 2.5 | 2.8 | 2.7 | 2.9 | 4.0 | 4.1 | 4.0 | 3.5 |

From the above adhesive agents A to F, it can be found that the adhesive agent of the present invention has increased adhesive force, and enhanced bad odor and heat resistance.

Although specific embodiments of the present invention are described in detail as described above, it will be apparent to those skilled in the art that the specific description is merely desirable exemplary embodiment and should not be construed as limiting the scope of the present invention. Therefore, the substantial scope of the present invention is defined by the accompanying claims and equivalent thereof.

The invention claimed is:

1. A hydrogenated petroleum resin containing repeating units represented by the following Chemical Formulas 1 and 2:

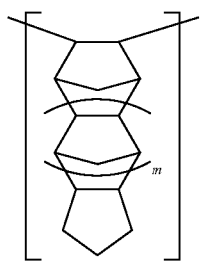

[Chemical Formula 1]

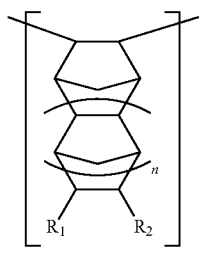

[Chemical Formula 2]

wherein, $R_1$ is H or a methyl group, $R_2$ is a C1 to C18 alkyl group, and $0 \leq m \leq 10$ and $0 \leq n \leq 10$, wherein the hydrogenated petroleum resin comprises the repeating unit of Chemical Formula 1 of 60 mol % to 90 mol % and the repeating unit of Chemical Formula 2 of 10 mol % to 40 mol %.

2. The hydrogenated petroleum resin of claim 1, wherein R1 is H, and R2 is a methyl group, an ethyl group, a propyl group, a butyl group, a pentyl group, a hexyl group, an octyl group, a nonyl group, a decyl group, a dodecyl group or a tetradecyl group.

3. The hydrogenated petroleum resin of claim 1, wherein R1 is H, and R2 is a butyl group, a pentyl group, a hexyl group, an octyl group, a nonyl group, a decyl group, a dodecyl group or a tetradecyl group.

4. The hydrogenated petroleum resin of claim 1, which has peak area at 0.8 ppm to 1.0 ppm against peak area at 1.4 ppm to 7.5 ppm of 0.2 or more, in the NMR spectrum obtained after measuring 1H-NMR.

5. The hydrogenated petroleum resin of claim 1, which has peak area at 1.0 ppm to 1.4 ppm against peak area at 1.4 ppm to 7.5 ppm of 0.5 or more, in the NMR spectrum obtained after measuring 1H-NMR.

6. The hydrogenated petroleum resin of claim 1, which has peak area at 0.8 ppm to 1.0 ppm against peak area at 1.4 ppm to 7.5 ppm of 0.2 to 0.8, and peak area at 1.0 ppm to 1.4 ppm against peak area at 1.4 ppm to 7.5 ppm of 0.5 to 0.8.

7. The hydrogenated petroleum resin of claim 1, which has full width at half maximum (FWHM) at 0.85 ppm peak of 0.1 ppm or less, in the NMR spectrum obtained after measuring 1H-NMR.

8. The hydrogenated petroleum resin of claim 1, which has FWHM at 1.20 ppm peak of 0.4 ppm or less, in the NMR spectrum obtained after measuring 1H-NMR.

9. The hydrogenated petroleum resin of claim 1, which has FWHM at 0.85 ppm peak of 0.01 ppm to 0.1 ppm, and FWHM at 1.20 ppm peak of 0.01 ppm to 0.4 ppm or less, in the NMR spectrum obtained after measuring 1H-NMR.

10. The hydrogenated petroleum resin of claim 1, which has weight average molecular weight of 500 g/mol to 3,000 g/mol, softening point of 90° C. to 150° C., and APHA color of 1 to 100.

11. An adhesive composition comprising the hydrogenated petroleum resin according to claim 1.

12. The adhesive composition of claim 11, which comprises at least one of a base polymer, wax and oil.

13. The adhesive composition of claim 11, which has softening point of 50° C. to 150° C., and melt viscosity of 300 cps to 10,000 cps at 160° C. and 200 cps to 8,000 cps at 180° C.

* * * * *